(12) United States Patent
Uemura et al.

(10) Patent No.: US 8,570,948 B2
(45) Date of Patent: Oct. 29, 2013

(54) COMMUNICATION SYSTEM, MOBILE STATION APPARATUS, RADIO LINK STATE MANAGEMENT METHOD, AND INTEGRATED CIRCUIT

(75) Inventors: Katsunari Uemura, Osaka (JP); Shohei Yamada, Osaka (JP); Daiichiro Nakashima, Osaka (JP); Yasuyuki Kato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/492,454

(22) Filed: Jun. 8, 2012

(65) Prior Publication Data
US 2012/0300701 A1 Nov. 29, 2012

Related U.S. Application Data

(63) Continuation of application No. PCT/JP2010/071895, filed on Dec. 7, 2010.

(30) Foreign Application Priority Data

Dec. 9, 2009 (JP) .................................. 2009-279652

(51) Int. Cl.
*H04W 4/00* (2009.01)
(52) U.S. Cl.
USPC ........................................ 370/328; 455/422.1
(58) Field of Classification Search
None
See application file for complete search history.

(56) References Cited

U.S. PATENT DOCUMENTS

| 6,473,411 | B1 * | 10/2002 | Kumaki et al. | 370/331 |
| 7,693,524 | B2 * | 4/2010 | Sakata et al. | 455/445 |
| 2002/0136193 | A1 * | 9/2002 | Chang et al. | 370/347 |
| 2002/0191562 | A1 * | 12/2002 | Kumaki et al. | 370/331 |
| 2010/0248726 | A1 * | 9/2010 | Kagimoto et al. | 455/437 |
| 2011/0026455 | A1 * | 2/2011 | Liu et al. | 370/328 |
| 2011/0182224 | A1 * | 7/2011 | Ishii | 370/311 |
| 2011/0263245 | A1 * | 10/2011 | Ishii et al. | 455/423 |

OTHER PUBLICATIONS

Catt, "Consideration on Radio Link Failure in CA", 3GPP TSG RAN WG2 Meeting #68, R2-096505, 3GPP, Nov. 9-13, 2009, pp. 1-3.
Huawei, "Radio Link Failure in CA", 3GPP TSG-RAN WG2 meeting #67bis, R2-096496, 3GPP, Nov. 9-13, 2009, pp. 1-4.
InterDigital, "RLF Procedures for Carrier Aggregation", 3GPP TSG-RAN WG2 Meeting #68, R2-096585, 3GPP, Nov. 9-13, 2009, 2 pages.

(Continued)

*Primary Examiner* — Clemence Han
(74) *Attorney, Agent, or Firm* — Birch, Stewart, Kolasch & Birch, LLP

(57) ABSTRACT

A base station apparatus performing communication through the use of a plurality of frequency bands and a mobile station apparatus wirelessly-connected to the base station apparatus, efficiently manage a radio link state of the frequency band in consideration of a cooperation relation between the plurality of frequency bands. The base station apparatus and the mobile station apparatus communicate with each other by aggregating a plurality of cells of different frequencies, the base station apparatus, in a case of configuring a plurality of cells of different frequencies to the mobile station apparatus, configures linkage information indicating a cooperation relation between an uplink and a downlink for each of the cells, and a timer for managing a state of the cells, and the mobile station apparatus simultaneously changes states of the uplink and the downlink of the cell upon timer being expiration, based on the linkage information for each the cell.

10 Claims, 16 Drawing Sheets

(56) References Cited

OTHER PUBLICATIONS

LG Electronics Inc., "Radio Link Failure considering carrier aggregation", 3GPP TSG-RAN2 Meeting #68, R2-096807, 3GPP, Nov. 9-14, 2009, pp. 1-4.

Nokia Corporation, Nokia Siemens Networks, "Radio link failure open issues", 3GPP TSG-RAN WG2 Meeting #68, R2-096845, 3GPP, Nov. 9-13, 2009, 4 pages.
PCT/ISA/210—International Search Report mailed on Mar. 8, 2011, issued in PCT/JP2010/071895.

* cited by examiner

COMMUNICATION SYSTEM, MOBILE STATION APPARATUS, RADIO LINK STATE MANAGEMENT METHOD, AND INTEGRATED CIRCUIT

This application is a continuation of PCT/JP2010/071895 filed on Dec. 7, 2010, which claims priority under 35 U.S.C. 119(a) to Patent Application No. 2009-279652 filed in Japan on Dec. 9, 2009, all of which are hereby expressly incorporated by reference into the present application.

TECHNICAL FIELD

The present invention relates to a communication system, a mobile station apparatus, a radio link state management method, and an integrated circuit and in particular, to the radio link state management method when the mobile station apparatus is wirelessly-connected to a base station apparatus through the use of a plurality of frequency bands.

BACKGROUND ART

In 3GPP (3rd Generation Partnership Project) which is a standardization project, there have been examined an OFDM (Orthogonal Frequency-Division Multiplexing) communication system, and Evolved Universal Terrestrial Radio Access (hereinafter referred to as EUTRA) in which high-speed communication has been achieved by employing flexible scheduling of a predetermined frequency/time unit called a resource block and furthermore, examination of Advanced EUTRA (also referred to as LTE-Advanced) which is the evolved type of EUTRA has been advanced.

In Advanced EUTRA, carrier aggregation has been proposed as a technology which can perform higher-speed data transmission, while maintaining compatibility with EUTRA. Carrier aggregation is a technology which improves a data rate by respectively receiving data of transmission apparatus transmitted in a plurality of different frequency bands (also referred to as carrier frequencies or component carriers) in reception apparatuses corresponding to the different frequency bands. It should be noted that although hereinafter, a reception apparatus in downlink transmission is described as a mobile station apparatus, and a transmission apparatus in downlink transmission is described as a base station apparatus, while a reception apparatus in uplink transmission is described as the mobile station apparatus, and a transmission apparatus in uplink transmission is described as the mobile station apparatus, there is no need to limit the range of application of the present invention, to these apparatuses.

A mobile station apparatus of EUTRA determines whether or not a base station apparatus currently wirelessly-connected to the mobile station apparatus is appropriate as a communication destination by detecting a radio link problem in a higher layer. The radio link problem is the problem (a physical layer problem in a physical layer, or a random access problem in a data link layer) generated in a lower layer (the physical layer and the data link layer). The physical layer problem is detected by an RRC (Radio Resource Control) based on notification of downlink out-of-sync and notification of downlink in-sync which are comparison results of a reception quality of a transmission signal from the base station apparatus, and a threshold value in a physical layer.

In addition, the random access problem is detected by an MAC (Medium Access Control) of the data link layer, and the MAC notifies the RRC of the random access problem when the number of preamble transmission reaches the maximum number of transmission. The MAC mainly performs management of random access transmission, management of an uplink transmission timing gap, management of a buffer state, etc. The RRC mainly performs management of a state of the lower layer, management of radio resource control, mobility control, etc. In addition, the RRC detects a radio link failure indicating that an error has occurred in radio connection with the base station apparatus based on the radio link problem, which has been detected or notification of which has been provided.

It should be noted that a third generation base station apparatus specified by 3GPP is referred to as a node B (NodeB), and that a base station apparatus in EUTRA and Advanced EUTRA is referred to as an e-node B (eNodeB). The base station apparatus manages a cell which is an area where the mobile station apparatus can communicate with the base station apparatus, and the cell is also referred to as a femto cell, a pico cell, or a nano cell in accordance with a size of the area where the base station apparatus can communicate with the mobile station apparatus. In addition, when the base station apparatus can communicate with a certain mobile station apparatus, a cell of the base station apparatus is a serving cell of the mobile station apparatus, and a cell of other base station apparatuses or of a different frequency is referred to as a neighboring cell.

CITATION LIST

Non-Patent Document

Non-Patent Document 1: R2-096505, CATT, 3GPP TSG-RAN WG2 Meeting #68, Jeju, South Korea, 9-13 Nov. 2009

Non-Patent Document 2: R2-096496, Huawei, 3GPP TSG-RAN WG2 Meeting #68, Jeju, South Korea, 9-13 Nov. 2009

Non-Patent Document 3: R2-096845, Nokia Corporation, Nokia Siemens Networks, 3GPP TSG-RAN WG2 Meeting #68, Jeju, South Korea, 9-13 Nov. 2009

DISCLOSURE OF THE INVENTION

Problems to be Solved by the Invention

A mobile station apparatus is required to detect a radio link failure from the viewpoint of a utilization efficiency of a radio resource even when a plurality of frequency bands is received. However, although until now a plurality of proposals has been made as in Non-Patent Documents 1 to 3 for a physical layer problem and a random access problem of the mobile station apparatus which receives the plurality of frequency bands, there has not been determined an operation of a mobile station apparatus in Advanced EUTRA (hereinafter simply abbreviated as a mobile station apparatus) when the physical layer problem and the random access problem have occurred. Particularly, it has not determined how the mobile station apparatus manages a radio link state of a frequency band (component carrier) in which the radio link problem has occurred.

Although the above-mentioned Non-Patent Documents 1 to 3 have disclosed that the mobile station apparatus detects the physical layer problem and the random access problem for each component carrier, and that a determination method for detecting occurrence of a radio link failure, they have not disclosed how the mobile station apparatus should manage a radio link state (radio connection state) of the other downlink component carrier or uplink component carrier when the radio link problem has occurred in a component carrier configured to the mobile station apparatus.

In view of the above-described problems, an object of the present invention is to provide a communication system, a mobile station apparatus, a radio link state management method, and an integrated circuit which can efficiently manage a radio link state of a frequency band in consideration of a cooperation relation between the plurality of frequency bands when the mobile station apparatus is wirelessly-connected to a base station apparatus using the plurality of frequency bands.

Means for Solving the Problems (1) In order to achieve the above-described object, an embodiment of the present invention has taken the following measures. That is, a communication system of the present invention is the communication system in which a base station apparatus and a mobile station apparatus perform communication with each other by aggregating a plurality of different frequency bands, and the communication system is characterized in that the base station apparatus configures to the mobile station apparatus downlink state determination information for managing a radio link state of at least one downlink frequency band, and random access information for managing a radio link state of at least one uplink frequency band, and that the mobile station apparatus detects a radio link problem indicating quality deterioration of the frequency band for each of the frequency band based on the information configured by the base station apparatus, and simultaneously changes radio link states of the frequency band in which the radio link problem has been detected, and of another frequency band having a cooperation relation with the frequency band in which the radio link problem has been detected.

(2) In addition, the communication system in an embodiment of the present invention is characterized in that when the mobile station apparatus changes a radio link state of one or more downlink frequency bands to which the downlink state determination information has been configured by the base station apparatus to a downlink component carrier failure indicating quality deterioration of a downlink frequency band, it simultaneously changes the radio link state of the uplink frequency band having the cooperation relation with the downlink frequency band.

(3) Furthermore, the communication system in an embodiment of the present invention is characterized in that the mobile station apparatus changes the radio link state of the uplink frequency band having the cooperation relation with the downlink frequency band in which the radio link state has been changed to the downlink component carrier failure to an uplink component carrier failure indicating quality deterioration of the uplink frequency band.

(4) Moreover, the communication system in an embodiment of the present invention is characterized in that the mobile station apparatus starts a radio resource reestablishment procedure when all the radio link states of the downlink frequency bands become the downlink component carrier failure, and when all the radio link states of the uplink frequency bands become the uplink component carrier failure by having changed the radio link state of the uplink frequency band having the cooperation relation with the downlink frequency band in which the radio link state has been changed to the downlink component carrier failure.

(5) In addition, the communication system in an embodiment of the present invention is characterized in that the mobile station apparatus starts the radio resource reestablishment procedure when all the radio link states of the uplink frequency bands become the uplink component carrier failure by having changed the radio link state of the uplink frequency band having the cooperation relation with the downlink frequency band in which the radio link state has been changed to the downlink component carrier failure.

(6) Moreover, the communication system in an embodiment of the present invention is characterized in that the mobile station apparatus starts the radio resource reestablishment procedure when the radio link state of the uplink frequency band which is an uplink anchor carrier becomes the uplink component carrier failure by having changed the radio link state of the uplink frequency band having the cooperation relation with the downlink frequency band in which the radio link state has been changed to the downlink component carrier failure.

(7) Furthermore, the communication system in an embodiment of the present invention is characterized in that when the mobile station apparatus changes a radio link state of one or more uplink frequency bands to which the random access information has been configured by the base station apparatus to the uplink component carrier failure indicating quality deterioration of an uplink frequency band, it simultaneously changes a radio link state of the downlink frequency band having a cooperation relation with the uplink frequency band.

(8) In addition, the communication system in an embodiment of the present invention is characterized in that the mobile station apparatus changes the radio link state of the downlink frequency band having the cooperation relation with the uplink frequency band in which the radio link state has been changed to the uplink component carrier failure to the downlink component carrier failure indicating quality deterioration of the downlink frequency band.

(9) Furthermore, the communication system in an embodiment of the present invention is characterized in that the mobile station apparatus starts the radio resource reestablishment procedure when all the radio link states of the uplink frequency bands become the uplink component carrier failure, and when all the radio link states of the downlink frequency bands become the downlink component carrier failure by having changed the radio link state of the downlink frequency band having the cooperation relation with the uplink frequency band in which the radio link state has been changed to the uplink component carrier failure.

(10) Moreover, the communication system in an embodiment of the present invention is characterized in that the mobile station apparatus starts the radio resource reestablishment procedure when all the radio link states of the downlink frequency bands become the downlink component carrier failure by having changed the radio link state of the downlink frequency band having the cooperation relation with the uplink frequency band in which the radio link state has been changed to the uplink component carrier failure.

(11) In addition, the communication system in an embodiment of the present invention is characterized in that the mobile station apparatus starts the radio resource reestablishment procedure when the radio link state of the downlink frequency band which is a downlink anchor carrier becomes the downlink component carrier failure by having changed the radio link state of the downlink frequency band having the cooperation relation with the uplink frequency band in which the radio link state has been changed to the uplink component carrier failure.

(12) Moreover, a mobile station apparatus in an embodiment of the present invention is the mobile station apparatus in a communication system in which a base station apparatus and the mobile station apparatus communicate with each other by aggregating a plurality of different frequency bands, and the mobile station apparatus is characterized by including a radio link state management unit which detects a radio link problem indicating quality deterioration of the frequency band for each of the frequency band based on information configured by the base station apparatus, and which simultaneously changes radio link states of the frequency band in which the radio link problem has been detected, and of another frequency band having a cooperation relation with the frequency band in which the radio link problem has been detected.

(13) Furthermore, the mobile station apparatus in an embodiment of the present invention is characterized by including the radio link state management unit which simultaneously changes the radio link state of the uplink frequency band having the cooperation relation with the downlink frequency band, when the mobile station apparatus changes a radio link state of one or more downlink frequency bands to which the downlink state determination information has been configured by the base station apparatus to the downlink component carrier failure indicating quality deterioration of the downlink frequency band.

(14) In addition, the mobile station apparatus in an embodiment of the present invention is characterized by including the radio link state management unit which changes the radio link state of the uplink frequency band having the cooperation relation with the downlink frequency band in which the radio link state has been changed to the downlink component carrier failure to the uplink component carrier failure indicating quality deterioration of the uplink frequency band.

(15) Furthermore, the mobile station apparatus in an embodiment of the present invention is characterized by including the radio link state management unit which starts the radio resource reestablishment procedure, when all the radio link states of the downlink frequency bands become the downlink component carrier failure, and when all the radio link states of the uplink frequency bands become the uplink component carrier failure by having changed the radio link state of the uplink frequency band having the cooperation relation with the downlink frequency band in which the radio link state has been changed to the downlink component carrier failure.

(16) Moreover, the mobile station apparatus in an embodiment of the present invention is characterized by including the radio link state management unit which starts the radio resource reestablishment procedure, when all the radio link states of the uplink frequency bands become the uplink component carrier failure by having changed the radio link state of the uplink frequency band having the cooperation relation with the downlink frequency band in which the radio link state has been changed to the downlink component carrier failure.

(17) In addition, the mobile station apparatus in an embodiment of the present invention is characterized by including the radio link state management unit which starts the radio resource reestablishment procedure, when the radio link state of the uplink frequency band which is the uplink anchor carrier becomes the uplink component carrier failure by having changed the radio link state of the uplink frequency band having the cooperation relation with the downlink frequency band in which the radio link state has been changed to the downlink component carrier failure.

(18) Furthermore, the mobile station apparatus in an embodiment of the present invention according to claim 10 is characterized by including the radio link state management unit which simultaneously changes the radio link state of the downlink frequency band having the cooperation relation with the uplink frequency band when the mobile station apparatus changes a radio link state of one or more uplink frequency bands to which the random access information has been configured by the base station apparatus to the uplink component carrier failure indicating quality deterioration of the uplink frequency band.

(19) Moreover, the mobile station apparatus in an embodiment of the present invention is characterized by including the radio link state management unit which changes the radio link state of the downlink frequency band having the cooperation relation with the uplink frequency band in which the radio link state has been changed to the uplink component carrier failure to the downlink component carrier failure indicating quality deterioration of the downlink frequency band.

(20) In addition, the mobile station apparatus in an embodiment of the present invention is characterized by including the radio link state management unit which starts the radio resource reestablishment procedure when all the radio link states of the downlink frequency bands become the downlink component carrier failure, and when all the radio link states of the downlink frequency bands become the downlink component carrier failure by having changed the radio link state of the downlink frequency band having the cooperation relation with the uplink frequency band in which the radio link state has been changed to the uplink component carrier failure.

(21) Furthermore, the mobile station apparatus in an embodiment of the present invention is characterized by including the radio link state management unit which starts the radio resource reestablishment procedure when all the radio link states of the downlink frequency bands become the downlink component carrier failure by having changed the radio link state of the downlink frequency band having the cooperation relation with the uplink frequency band in which the radio link state has been changed to the uplink component carrier failure.

(22) Moreover, the mobile station apparatus in an embodiment of the present invention is characterized by including the radio link state management unit which starts the radio resource reestablishment procedure when the radio link state of the downlink frequency band which is the downlink anchor carrier becomes the downlink component carrier failure by having changed the radio link state of the downlink frequency band having the cooperation relation with the uplink frequency band in which the radio link state has been changed to the uplink component carrier failure.

(23) In addition, a radio link state management method in an embodiment of the present invention is the radio link state management method in a communication system in which a base station apparatus and a mobile station apparatus communicate with each other by aggregating a plurality of different frequency bands, and the radio link state management method is characterized by including the steps of: in the mobile station apparatus, detecting a radio link problem indicating quality deterioration of the frequency band for each of the frequency band based on information configured by the base station apparatus; and simultaneously changing radio link states of the frequency band in which the radio link problem has been detected, and of another frequency band having a cooperation relation with the frequency band in which the radio link problem has been detected.

(24) In addition, an integrated circuit in an embodiment of the present invention is the integrated circuit which performs radio link state management of a mobile station apparatus in a communication system in which a base station apparatus and the mobile station apparatus communicate with each other by aggregating a plurality of different frequency bands, and the integrated circuit is characterized by including a radio link state management unit which detects a radio link problem indicating quality deterioration of the frequency band for each of the frequency band based on information configured by the base station apparatus, and which simultaneously changes radio link states of the frequency band in which the radio link problem has been detected, and of another frequency band having a cooperation relation with the frequency band in which the radio link problem has been detected.

Advantages of the Invention

As described above, the present invention can provide a communication system, a mobile station apparatus, a radio link state management method, and an integrated circuit which can efficiently manage a radio link state of a frequency band in consideration of a cooperation relation between a plurality of frequency bands when the mobile station apparatus is wirelessly-connected to a base station apparatus by using the plurality of frequency bands.

BEST MODES FOR CARRYING OUT THE INVENTION

Figure 1:
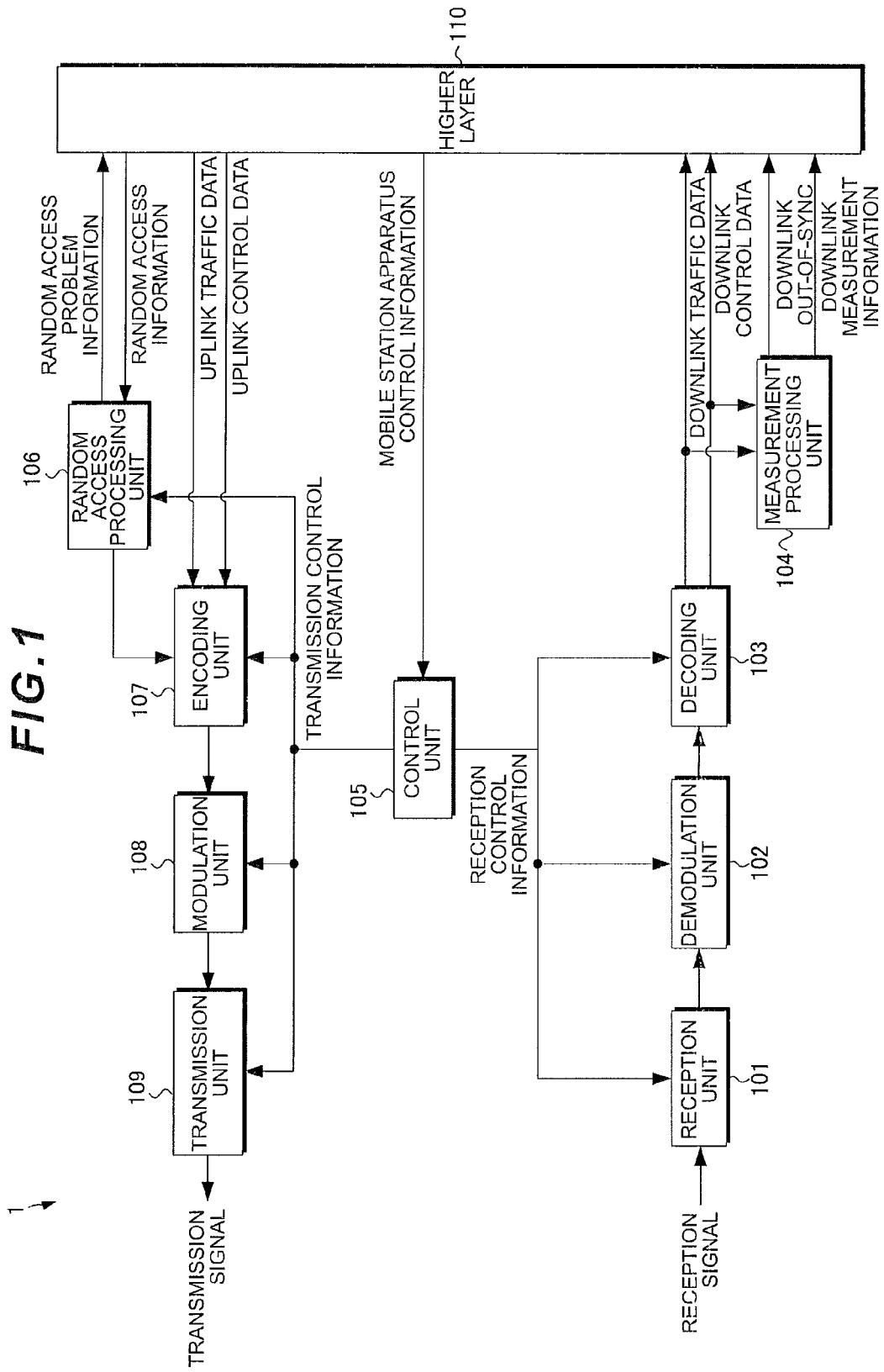
FIG. 1 is a block diagram illustrating one example of a mobile station apparatus 1 according to an embodiment of the present invention.

Before an embodiment of the present invention is described, there will be described a physical channel and a physical layer problem, a random access problem, and carrier aggregation relating to the present invention.

(1-1) Physical Channel

A physical channel (or a physical signal) used in EUTRA and Advanced EUTRA will be described. The physical channel includes a downlink channel in a downlink used for transmission from a base station apparatus to a mobile station apparatus, and an uplink channel in an uplink used for transmission from the mobile station apparatus to the base station apparatus. Although the physical channel may be added or a structure thereof may be changed in the future in EUTRA and Advanced EUTRA, a description of each embodiment of the present invention is not affected even when the configuration of the physical channel is changed.

Synchronization signals are configured with three types of primary synchronization signals, and a secondary synchronization signal configured with thirty-one types of codes alternately arranged in a frequency domain, and five hundreds and four kinds of cell IDs (PCI (Physical Cell Identity)) which identify the base station apparatus, and a frame timing for radio synchronization are indicated by a combination of signals of the primary synchronization signal and the secondary synchronization signal. The mobile station apparatus specifies a cell ID of a synchronization signal received by cell search.

A PBCH (Physical Broadcast Channel) is transmitted for the purpose of providing notification of a control parameter (broadcast information (system information)) commonly used in the mobile station apparatuses in a cell. Broadcast information which is not notified through the PBCH is transmitted with a layer 3 message by using a physical downlink shared channel after a radio resource being notified through a physical downlink control channel. As the broadcast information, notification of a CGI (Cell Global Identifier) indicating an identifier of an individual cell, a TAI (Tracking Area Identifier) which manages a standby area by paging, or the like is provided.

A downlink reference signal is a pilot signal transmitted with predetermined electric power for each cell. In addition, the downlink reference signal is a known signal periodically repeated at a frequency/time position based on a predetermined rule. The mobile station apparatus measures a reception quality for each cell by receiving the downlink reference signal. Furthermore, the mobile station apparatus uses the physical downlink control channel which is transmitted simultaneously with the downlink reference signal, or the downlink reference signal also as a reference signal for demodulation of the physical downlink shared channel. A sequence which can be identified for each cell is used as a sequence used in the downlink reference signal. It should be noted that although there is also a case in which the downlink reference signal is described as a cell-specific reference signal, the applications and meanings of the two are the same as each other.

A PDCCH (Physical Downlink Control Channel) is transmitted with some OFDM symbols from a head of each subframe, and is used for the purpose of instructing, to the mobile station apparatus, radio resource allocation information in accordance with scheduling of the base station apparatus, and an adjustment amount of increase and decrease of transmit power. The mobile station apparatus needs to obtain radio resource allocation information referred to as an uplink grant at the time of transmission and referred to as a downlink grant at the time of reception by monitoring a PDCCH addressed to the mobile station apparatus itself and receiving the PDCCH addressed to the mobile station apparatus itself, before transmitting and receiving the layer 3 message (paging, a hand over command, etc.) which is downlink data or downlink control data.

A PDSCH (Physical Downlink Shared Channel) is also used in order to provide notification of paging and broadcast information as the layer 3 message which is downlink control data in addition to downlink data. The radio resource allocation information of the PDSCH is indicated through the PDCCH.

A PUSCH (Physical Uplink Shared Channel) mainly transmits uplink data and uplink control data, and can include a reception quality in the downlink and control data such as ACK/NACK. In addition, radio resource allocation information of the PUSCH is indicated through the PDCCH in the same way as in the downlink.

A PRACH (Physical Random Access Channel) is the channel used to provide notification of a preamble sequence, and it has a guard time. The PRACH is used as an access means of the mobile station apparatus to the base station apparatus. The mobile station apparatus uses the PRACH for a scheduling request of transmission data in case of non-configuration of the PUCCH and for a request of transmission timing adjustment information required to adjust an uplink transmission timing to a reception timing window of the base station apparatus. The mobile station apparatus which received the transmission timing adjustment information sets a valid time of the transmission timing adjustment information, and it becomes a transmission timing adjustment state during a valid time, and becomes a transmission timing non-adjustment state during a period other than the valid period. It should be noted that since the other physical channels are not related with each embodiment of the present invention, a detailed description thereof will be omitted.

(1-2) Physical Layer Problem

Figure 13:
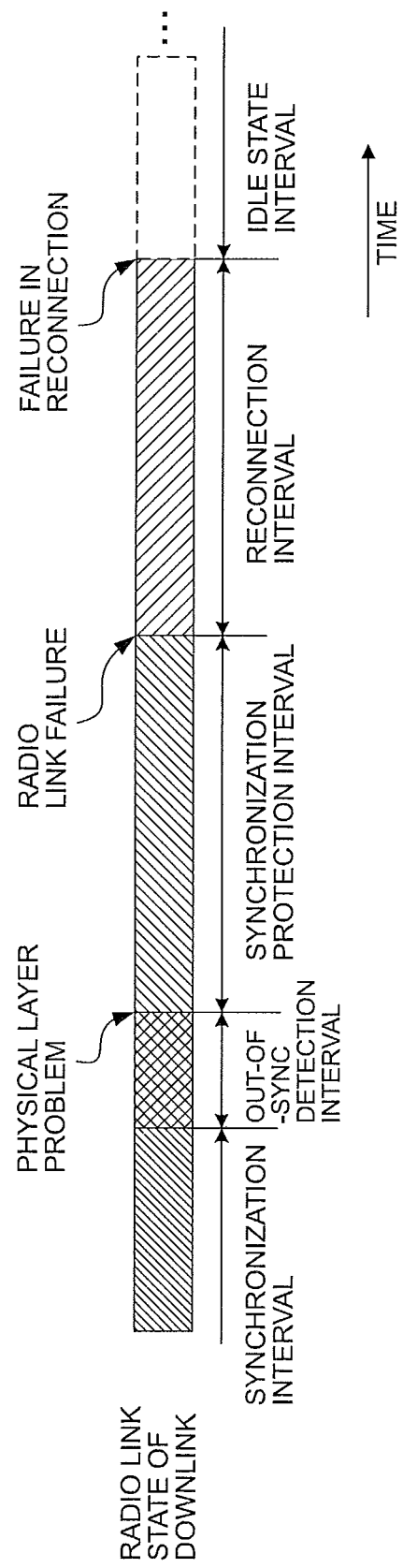
FIG. 13 is a chart illustrating a method for state transition of a radio link state in a conventional downlink.

FIG. 13 is one example of a conventionally used radio link state determination procedure regarding a physical layer problem, and illustrates state transition with the passage of time. The mobile station apparatus manages a radio link state of a downlink by comparing a reception quality of any of receiving downlink channels with a threshold value. Comparison between the reception quality and the threshold value is typically carried out in a physical layer, and the radio link state of the downlink is typically managed by the RRC.

FIG. 13 is one example illustrating transition of a radio link state of a downlink of a mobile station apparatus when a reception quality in the downlink is not recovered after downlink out-of-sync is detected in a physical layer, and the mobile station apparatus transitions to an idle state (a state where the mobile station apparatus is not connected to a base station apparatus through a radio resource) without being reconnected. Here, when the mobile station apparatus determines that the reception quality has deteriorated much more than a predetermined threshold value, it transmits downlink out-of-sync from the physical layer to the RRC. When notification of the downlink out-of-sync is provided, the mobile station apparatus causes the radio link state of the downlink to transition from a synchronization interval to an out-of-sync detection interval in the RRC, and determines whether or not the downlink out-of-sync temporarily occurs.

Furthermore, when notification of downlink out-of-sync is provided continuously from the physical layer also in the out-of-sync detection interval, and downlink out-of-sync is detected continuously by a certain number of times, or when downlink out-of-sync is detected continuously for a certain time, the mobile station apparatus determines that a radio link problem (physical layer problem) has occurred, subsequently causes the radio link state of the downlink to transition to a synchronization protection interval where recovery of the reception quality is waited, and simultaneously starts a synchronization protection timer which clocks the synchronization protection interval.

When the reception quality of the downlink channel is not recovered even if the synchronization protection timer expires, the mobile station apparatus determines that the downlink gets to a radio link failure indicating the quality deterioration of the downlink, causes the radio link state of the downlink to transition to a reconnection interval where radio resource connection is tried to be reestablished, and simultaneously starts a reconnection timer which clocks the reconnection interval. In the reconnection interval, the mobile station apparatus performs a cell reselection procedure in which a cell of a good reception quality is selected. The mobile station apparatus which has selected the good cell in accordance with the cell reselection procedure starts a random access procedure, and notifies the good cell of a reconnection request message (radio resource reestablishment message). When the base station apparatus has not provided notification of permission for the reconnection request message by the time measurement by the reconnection timer expires, the mobile station apparatus determines to have failed in reestablishing the radio resource connection, releases the stored radio resource, and transitions to an idle state interval where the mobile station apparatus is not connected to the base station apparatus through the radio resource.

(2) Random Access Problem

The mobile station apparatus manages a random access problem in a data link layer by counting the number of transmission trials of the PRACH. The counting of the number of transmission trials of the PRACH in this data link layer is typically carried out by the MAC, and the random access problem is managed by the RRC.

When the reason for transmission of any PRACH to the base station apparatus is caused, the mobile station apparatus transmits a randomly selected preamble sequence or a preamble sequence allocated by the base station apparatus, to the base station apparatus by using the PRACH. At this time, when a response to the PRACH is not returned from the base station apparatus within a certain time for reasons such as the inability of the base station apparatus to identify the PRACH, the mobile station apparatus transmits the PRACH again. The mobile station apparatus counts the number of transmission of the PRACH, and determines that a random access problem indicating quality deterioration of an uplink has been detected when the number of transmission exceeds a predefined value (maximum number of transmission). It should be noted that even if the mobile station apparatus detects the random access problem, it continues to transmit the PRACH to the base station apparatus by using the same parameter, until instructions for stopping random access, etc. are issued. The instruction for stopping random access is typically performed from the RRC to the MAC.

(3) Carrier Aggregation

Carrier aggregation is a technology which aggregates (performs aggregation) a plurality of different frequency bands (component carriers) to treat them as one frequency band. For example, when five component carriers of 20 MHz frequency bandwidth are aggregated by carrier aggregation, the mobile station apparatus can regard it as a 100 MHz frequency bandwidth to perform access. It should be noted that component carriers to be aggregated may be contiguous frequency bands, or the whole or a part of component carrier may be discontiguous frequency bands. For example, when available frequency bands are a 800 MHz band, a 2.4 GHz band, and a 3.4 GHz band, one component carrier may be transmitted in the 800 MHz band, another component carrier in the 2 GHz band, and still another component carrier in the 3.4 GHz band.

In addition, it is also possible to aggregate continuous or discontiguous component carriers in the same frequency band, for example, in the 2.4 GHz band. A frequency bandwidth of each component carrier may be the frequency bandwidth narrower than 20 MHz, or may be different from each other.

The base station apparatus can increase or decrease the number of component carriers of the uplink or the downlink allocated to the mobile station apparatus based on various factors such as a retained data buffer amount and a reception quality of the mobile station apparatus, a load in a cell and QoS.

[Example of Communication Network Configuration of the Present Invention]

Figure 14:
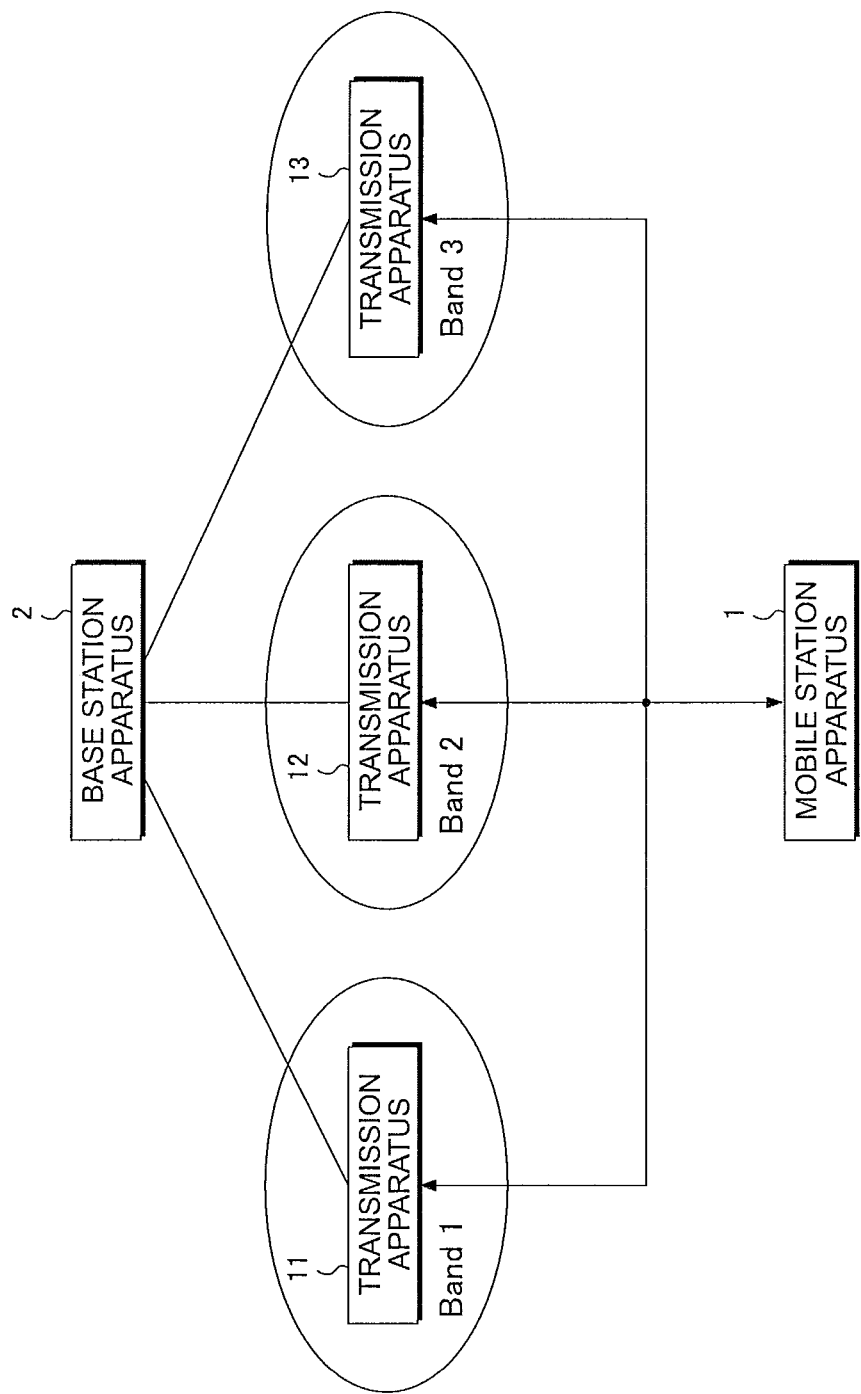
FIG. 14 is a diagram illustrating one example of a communication network configuration according to the embodiment of the present invention.

FIG. 14 is a diagram illustrating one example of a communication network configuration according to the embodiment of the present invention. When a mobile station apparatus 1 can be wirelessly-connected to a base station apparatus 2 by carrier aggregation simultaneously by using a plurality of frequency bands (component carriers, Band 1 to Band 3), as a communication network configuration, such a configuration is suitable from the viewpoint of simplification of control that one certain base station apparatus 2 includes transmission apparatuses 11 to 13 (and reception apparatuses 21 to 23 which are not illustrated) for each plurality of frequency bands, and that control for each frequency band is performed in the one base station apparatus 2. However, such a configuration may be employed that the base station apparatus 2 performs transmission of the plurality of frequency bands by one transmission apparatus for reasons such as the plurality of frequency bands being contiguous frequency bands. A communication range of each frequency band controlled by the transmission apparatus of the base station apparatus 2 is regarded as a cell, and the cells exist spatially in the same area. At this time, areas (cells) covered by each frequency band may have a different size and a different shape, respectively.

However, although areas covered by frequencies of component carriers formed by the base station apparatus 2 will be described by referring to as cells, respectively in a description which will be mentioned hereinafter, it should be noted that a definition of the cell may be different from that of the cell in an actually operated communication system. For example, in a certain communication system, a part of the component carriers used by carrier aggregation may be defined as not the cell but a mere added radio resource. Even if a case occurs where the definition of the cell herein is different from that of the cell in the actually operated communication system by referring to the component carrier as the cell in the present invention, the case does not affect a main purpose of the present invention. It should be noted that the mobile station apparatus 1 may be wirelessly-connected to the base station apparatus 2 via a relay station apparatus (or a repeater).

[Setting Example of Configuration of Component Carrier]

Figure 15:
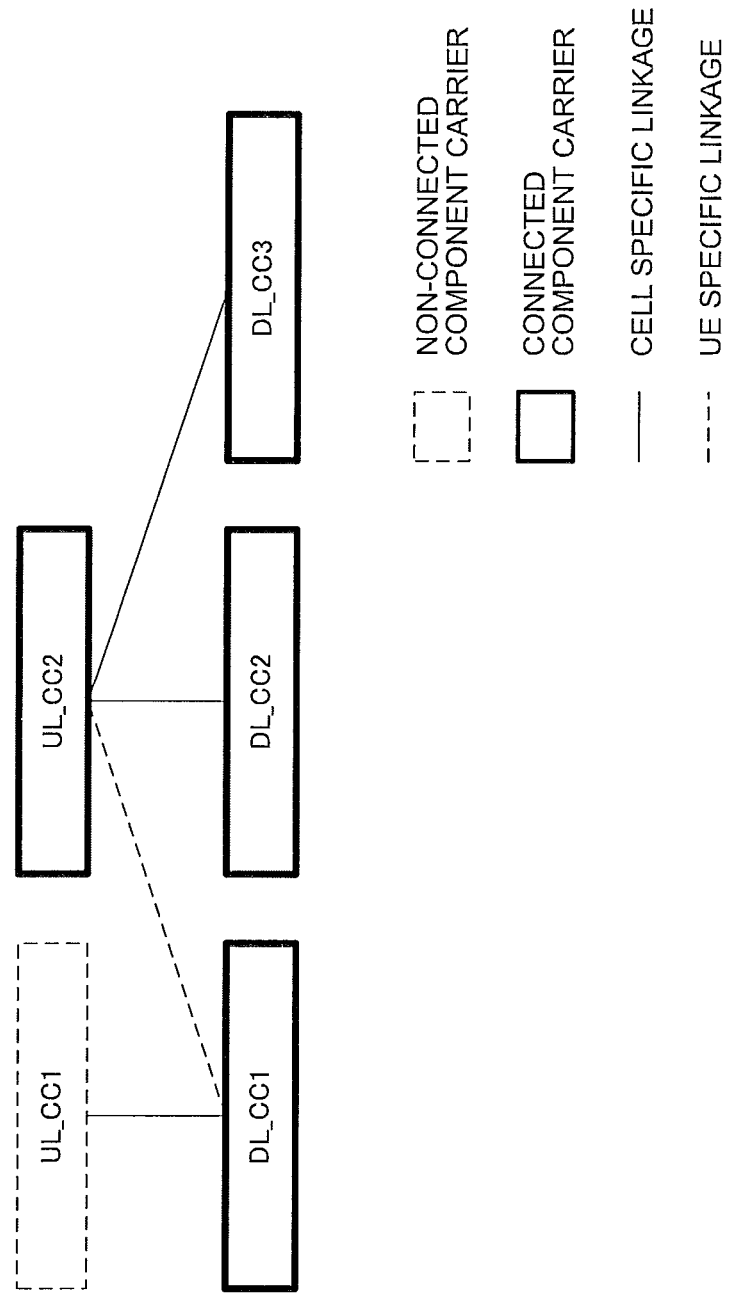
FIG. 15 is a diagram illustrating one example of component carrier setting to the mobile station apparatus 1 according to the embodiment of the present invention.

FIG. 15 is a diagram illustrating one example of a correspondence relation between a downlink component carrier the base station apparatus 2 configures to the mobile station apparatus 1, and an uplink component carrier, when the mobile station apparatus 1 according to the embodiment of the present invention performs carrier aggregation. A downlink component carrier DL_CC1 and an uplink component carrier UL_CC1, and a downlink component carrier DL_CC2 and a downlink component carrier DL_CC3 and an uplink component carrier UL_CC2, in FIG. 15 are cell-specific-linked. The cell-specific linkage is a correspondence relation (cooperation relation) between uplink and downlink frequency bands accessible to the base station apparatus 2, when, for example, the mobile station apparatus 1 does not perform carrier aggregation, and typically, the correspondence relation is indicated by broadcast information. The correspondence relation between the uplink and downlink frequency bands is explicitly indicated in the broadcast information as frequency information, or it is implicitly indicated by a method such as using information of a predefined frequency difference between the uplink and the downlink which is uniquely determined for each operation frequency when not indicated explicitly. Without limiting to these methods, the correspondence relation may be indicated by using a method other than these as long as it is possible to indicate the correspondence relation of the uplink and downlink frequency bands for each cell. There is a case where a plurality of component carriers is cell-specific-linked to one component carrier.

In contrast with this, it is possible for the base station apparatus 2 to configure, by a UE specific linkage, the correspondence relation between the downlink component carrier and the uplink component carrier, for each mobile station apparatus 1 separately from the cell-specific linkage. There is a case where a plurality of component carriers is UE-specific-linked to one component carrier. In a case of FIG. 15, the three downlink component carriers DL_CC1 to DL_CC3 correspond to the uplink component carrier UL_CC2 to which a certain mobile station apparatus 1 is wirelessly-connected, the DL_CC1 and the UL_CC2 are UE-specific-linked, and the DL_CC2 and the DL_CC3 are cell-specific-linked to the UL_CC2. In this case, the mobile station apparatus 1 performs reception processing in the DL_CC1 to the DL_CC3, and performs transmission processing in the UL_CC2. That is, the DL_CC1 to the DL_CC3 and the UL_CC2 are connected component carriers the mobile station apparatus 1 uses for communication with the base station apparatus 2, and the UL_CC1 is a non-connected component carrier the mobile station apparatus 1 does not use for communication with the base station apparatus 2.

[Setting Example of Layer Configuration of Mobile Station Apparatus]

Figure 16:
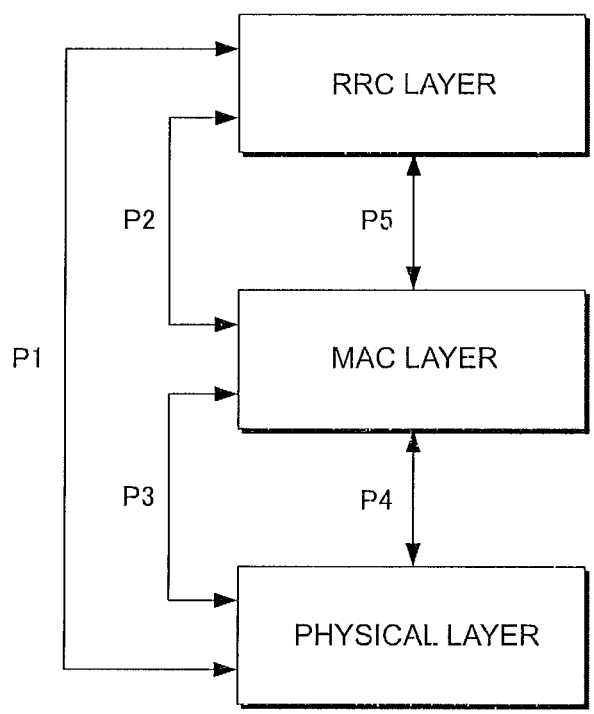
FIG. 16 is a diagram illustrating one example of a layer configuration of the mobile station apparatus 1 according to the embodiment of the present invention.

FIG. 16 illustrates one example of an RRC (RRC layer) and a MAC (MAC layer), and a layer configuration (protocol stack) of a physical layer and interfaces between the layers, in a mobile station apparatus. The RRC is an higher layer of the MAC and the physical layer, and the MAC is a lower layer of the RRC and is an higher layer of the physical layer. Each layer is connected there between by using control interfaces P1 to P3, and data interfaces P4 to P5. The control interface P1 between the RRC and the physical layer is used in order to set a control parameter from the RRC to the physical layer, and in order for the physical layer to notify the RRC of downlink out-of-sync. The control interface P2 between the RRC and the MAC is used in order for the RRC to set a control parameter to the MAC, and in order for the MAC to notify the RRC of a random access problem.

The control interface P3 between the MAC and the physical layer is used in order for the MAC to set a control parameter to the physical layer. Furthermore, the data interface P4 between the MAC and the physical layer is used in order for the MAC to notify the physical layer of transmission data, and in order for the physical layer to notify the MAC of received data. The data interface P5 between the RRC and the MAC is used in order for the RRC to notify the MAC of the transmission data, and in order for the MAC to notify the RRC of the received data. It should be noted that although there is a case where an entity and a sublayer having data control functions, such as an RLC (Radio Link Control) and a PDCP (Packet Data Convergence Protocol), are included between the RRC and the MAC as an actual configuration of the mobile station apparatus, even the case does not affect the main purpose of the present invention.

In consideration of the above items, hereinafter, preferred embodiments of the present invention will be described in detail based on accompanying drawings. It should be noted that when it is determined in a description of the present invention that specific descriptions of the well-known functions and configurations related to the present invention make a point of the present invention ambiguous, detailed descriptions thereof will be omitted.

First Embodiment

A first embodiment of the present invention will be described hereinafter. The embodiment relates to a management method for a radio link state of a component carrier along with a radio link problem detected by the mobile station apparatus 1 during carrier aggregation.

FIG. 1 is a block diagram illustrating one example of the mobile station apparatus 1 according to the embodiment of the present invention. The mobile station apparatus 1 is configured with a reception unit 101, a demodulation unit 102, a decoding unit 103, a measurement processing unit 104, a control unit 105, a random access processing unit 106, an encoding unit 107, a modulation unit 108, a transmission unit 109, and an higher layer 110. Prior to reception, mobile station apparatus control information is input into the control unit 105 from the higher layer 110, and the mobile station apparatus control information regarding reception is appropriately input as reception control information into the reception unit 101, the demodulation unit 102, the decoding unit 103, and the measurement processing unit 104. In the reception control information, information such as demodulation information, decoding information, information of a received frequency band, a reception timing regarding each channel, a multiplexing method, and radio resource arrangement information is included as reception schedule information.

A reception signal is received in the reception unit 101. The reception unit 101 receives the signal in a frequency band, notification of which is provided by the reception control information. The reception signal is input into the demodulation unit 102. The demodulation unit 102 demodulates the reception signal, and inputs the reception signal into the decoding unit 103. The decoding unit 103 properly decodes the reception signal based on the reception control information. The decoding unit 103 appropriately separates the reception signal into downlink traffic data and downlink control data, and inputs them into the higher layer 110, respectively. In addition, the decoding unit 103 inputs the decoded reception signal regarding measurement into the measurement processing unit 104. The measurement processing unit 104 performs measurement processing of a reception quality of a downlink reference signal for each cell, and measurement processing of a reception error rate of a PDCCH or a PDSCH, generates downlink measurement information obtained by averaging (filtering) the measured reception qualities for each sample, and outputs the downlink measurement information to the higher layer 110. In addition, the measurement processing unit 104 compares the obtained reception quality with a threshold value (also called Qout) used for detection of downlink out-of-sync, and outputs the downlink out-of-sync to the higher layer 110 as necessary.

In addition, prior to transmission, the mobile station apparatus control information is input into the control unit 105 by the higher layer 110, and the mobile station apparatus control information regarding transmission is appropriately input as transmission control information into the random access processing unit 106, the encoding unit 107, the modulation unit 108, and the transmission unit 109. In the transmission control information, information, such as encoding information, modulation information, information of a transmission frequency band, a reception timing regarding each channel, a multiplexing method, and radio resource arrangement information, is included as uplink scheduling information of a transmission signal. Into the random access processing unit 106, random access information required for transmission of the PRACH such as radio resource information and a maximum number of transmissions of random access, is input from the higher layer 110. In addition, when the random access processing unit 106 has detected a random access problem by counting the number of transmissions of the PRACH, the unit notifies the higher layer 110 of random access problem information indicating that the random access problem has occurred. Into the encoding unit 107, uplink traffic data and uplink control data are input from the higher layer 110, and random access data is input from the random access processing unit 106. The encoding unit 107 appropriately encodes each data in accordance with the transmission control information, and outputs it to the modulation unit 108. The modulation unit 108 modulates the input from the encoding unit 107.

The transmission unit 109 converts a signal of a frequency domain into a signal of a time domain as well as mapping the output of the modulation unit 108 in the frequency domain, and transmits the signal as well as placing it on a carrier of a predefined frequency to perform power amplification. The PUSCH in which the uplink control data is arranged typically configures a layer 3 message (RRC message (radio resource control message)). The RRC of the mobile station apparatus 1 exists as a part of the higher layer 110. The RRC further includes a radio link state management unit (not illustrated) which is a subblock managing a radio link state indicating a state of a frequency band, for each plurality of frequency bands. In addition, the random access processing unit 106 exists as a part of the MAC of the mobile station apparatus 1. Since the other components of the mobile station apparatus 1 are not related to the embodiment, they are omitted in FIG. 1.

Figure 2:
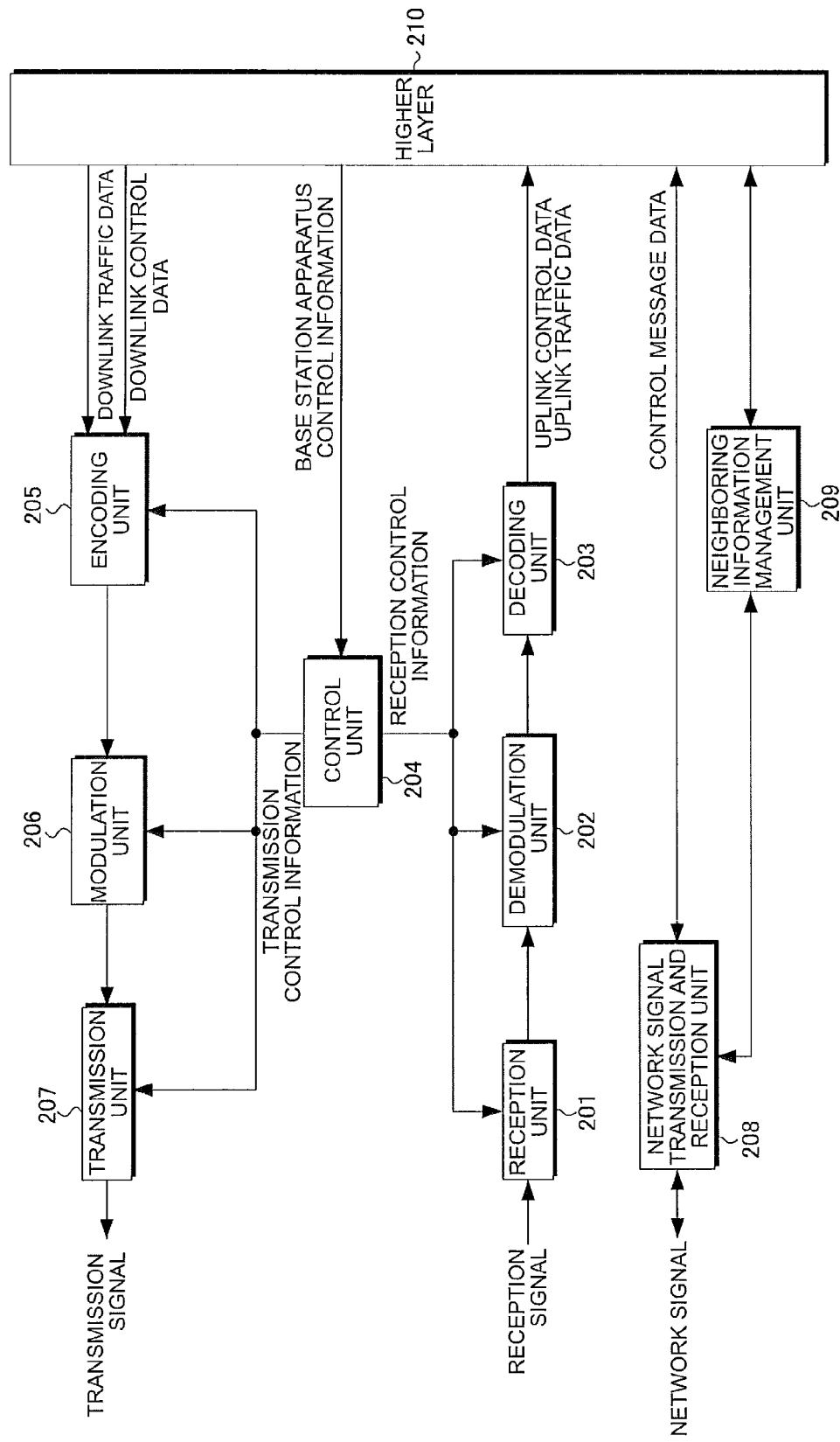
FIG. 2 is a block diagram illustrating one example of a base station apparatus 2 according to the embodiment of the present invention.

FIG. 2 is a block diagram illustrating one example of the base station apparatus 2 according to the embodiment of the present invention. The base station apparatus 2 is configured with a reception unit 201, a demodulation unit 202, a decoding unit 203, a control unit 204, an encoding unit 205, a modulation unit 206, a transmission unit 207, a network signal transmission and reception unit 208, a neighboring information management unit 209, and an higher layer 210.

The higher layer 210 inputs the downlink traffic data and the downlink control data into the encoding unit 205. The encoding unit 205 encodes each input data, and inputs it into the modulation unit 206. The modulation unit 206 performs modulation of an encoded signal. In addition, in the modulation unit 206, a downlink reference signal is multiplexed with respect to the modulated signal, and it is mapped in the frequency domain. The transmission unit 207 converts a signal of a frequency domain output from the modulation unit 206 into a signal of a time domain, and transmits a converted signal as well as placing it on a carrier of a predefined frequency, to perform power amplification. The PDSCH in which the downlink control data is arranged, typically configures the layer 3 message (RRC message).

In addition, the reception unit 201 converts a reception signal from the mobile station apparatus 1 into a baseband digital signal. The digital signal is input into the demodulation unit 202, and is demodulated. A signal demodulated by the demodulation unit 202 is subsequently input into the decoding unit 203, and is decoded. The decoding unit 203 appropriately separates the reception signal into uplink traffic data and uplink control data, and inputs them into the higher layer 210, respectively.

Base station apparatus control information required for control of the above-described each block is input into the control unit 204 from the higher layer 210, the base station apparatus control information related to transmission is appropriately input as transmission control information into each block of the encoding unit 205, the modulation unit 206, and the transmission unit 207 from the control unit 204, and the base station apparatus control information related to reception is appropriately input as reception control information into each block of the reception unit 201, the demodulation unit 202, the decoding unit 203.

Meanwhile, the network signal transmission and reception unit 208 performs transmission or reception of a control message between the base station apparatuses 2 or between a control station apparatus (or a gateway apparatus) and the base station apparatus 2. The control message is transmitted and received via a network line. The neighboring information management unit 209 manages network information for specifying the base station apparatus 2 (or the control station apparatus or the gateway apparatus), which is a transmission destination or a transmission source. The network information is configured with information with which an address on the network of each apparatus can be specified, such as a Tracking Area Identifier (TAI), a Cell Global Identifier (CGI), a Physical Cell Identity (PCI), a network color code, an Internet Protocol Address (IP address).

The neighboring information management unit 209 provides the network signal transmission and reception unit 208, with the network information as necessary. The higher layer 210 manages the network signal transmission and reception unit 208 and the neighboring information management unit 209. An RRC of the base station apparatus 2 exists as a part of the higher layer 210. Since the other components of the base station apparatus 2 are not related to the embodiment, they are omitted in FIG. 2.

Subsequently, by using FIGS. 3 to 12, there will be described a radio link state management method for each frequency band, which is performed by the mobile station apparatus 1 of the embodiment when a radio link problem is detected. Radio link state management illustrated below is performed by a radio link state management unit of the mobile station apparatus 1.

The mobile station apparatus 1 determines a physical layer problem for all the downlink component carriers configured from the base station apparatus 2, or for each downlink component carrier in which the PDCCH (Physical Downlink Control Channel) is monitored, or for each downlink component carrier to which downlink state determination information (each timer or the like used for determination of a maximum allowable number of times of downlink out-of-sync or state transition) has been configured. The mobile station apparatus 1 manages a radio link state (downlink state) of the downlink component carrier to which the downlink state determination information has been configured. In addition, the mobile station apparatus 1 determines a random access problem for each at least one or more uplink component carriers to which random access information (the maximum number of transmission, etc.) has been configured. The mobile station apparatus 1 manages a radio link state (uplink state) of the uplink component carrier to which the random access information has been configured. The mobile station apparatus 1 is not required to detect the random access problem in an uplink component carrier to which the random access information has not been configured.

It should be noted that a physical layer problem detected in a downlink component carrier is referred to as a DL_CC failure (downlink component carrier failure) in a subsequent description. In addition, a random access problem detected in an uplink component carrier is referred to as an UL_CC failure (uplink component carrier failure).

The base station apparatus 2 can also configure to the mobile station apparatus 1 the downlink state determination information used for detection of the physical layer problem for each downlink component carrier. Typically, the base station apparatus 2 configures the downlink state determination information only to a downlink component carrier in which the mobile station apparatus 1 is instructed to monitor the PDCCH. In addition, the base station apparatus 2 can also configure random access information to the mobile station apparatus 1 for each uplink component carrier. Typically, the base station apparatus 2 configures the random access information to at least one uplink component carrier for each group of the uplink component carriers having different uplink transmission timings which are configure to the mobile station apparatus 1.

Figure 3:
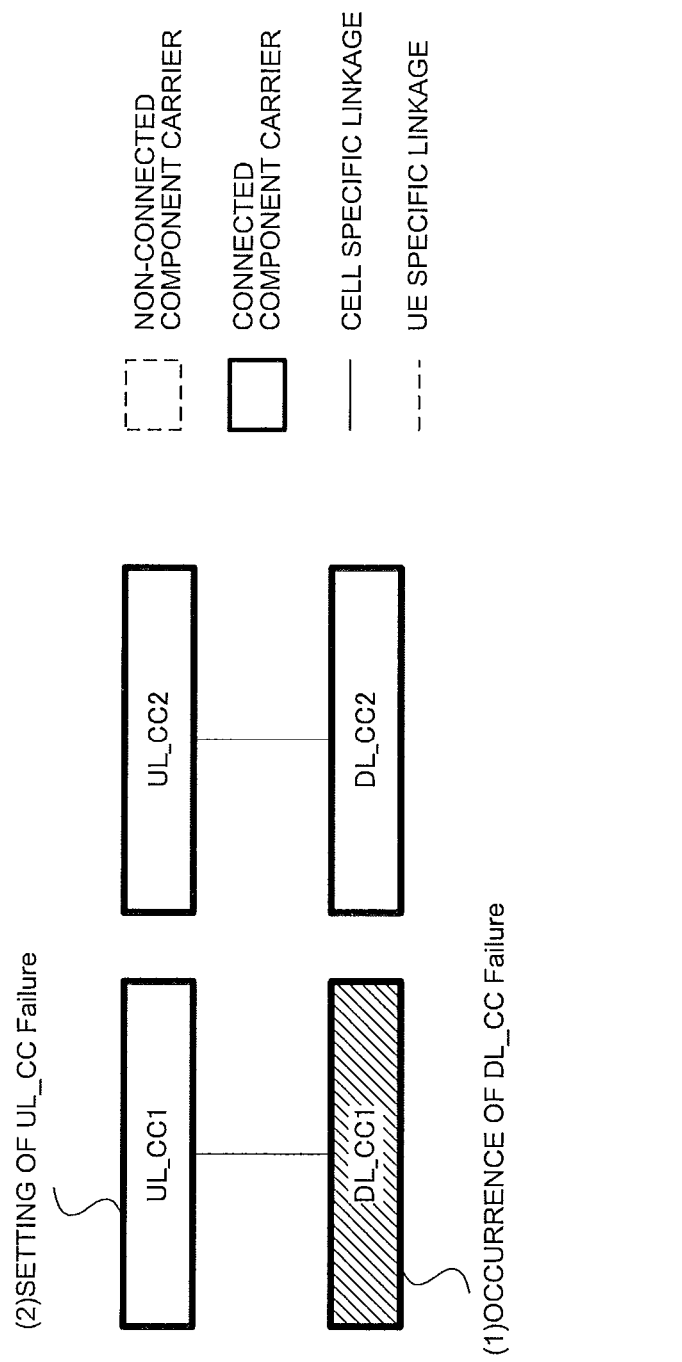
FIG. 3 is a diagram for illustrating a radio link management method when a radio link problem has been detected.

FIG. 3 is a diagram for illustrating a radio link state management method for each component carrier in a case where a radio link problem has occurred in a certain downlink component carrier when the plurality of component carriers are configured to the mobile station apparatus 1 by carrier aggregation.

In FIG. 3, a downlink component carrier DL_CC1 and a downlink component carrier DL_CC2, and an uplink component carrier UL_CC1 and an uplink component carrier UL_CC2 are configured to the mobile station apparatus 1 as carrier aggregation by the base station apparatus 2. In addition, the DL_CC1 and the UL_CC1, and the DL_CC2 and the UL_CC2 are cell-specific-linked, respectively.

Returning to FIG. 3, when the mobile station apparatus 1 has detected occurrence of the DL_CC failure in the DL_CC1, a random access procedure and transmit power adjustment regarding the UL_CC1 are based on a reception quality of the cooperating DL_CC1, and thus complicated and special control different from a conventional one is required in order to continue transmission in the UL_CC1 when the DL_CC failure has occurred in the DL_CC1. Consequently, the mobile station apparatus 1 of the embodiment sets the UL_CC failure to the UL_CC1 which is cell-specific-linked to the DL_CC1 in order not to perform the above-described special control. That is, the RRC which has detected that the physical layer problem has occurred in the DL_CC1 updates a radio link state of the UL_CC1 corresponding to the DL_CC1. It should be noted that the mobile station apparatus 1 is not required to update radio link states of the DL_CC2 and the UL_CC2 which are not cell-specific-linked to the DL_CC1.

Figure 4:
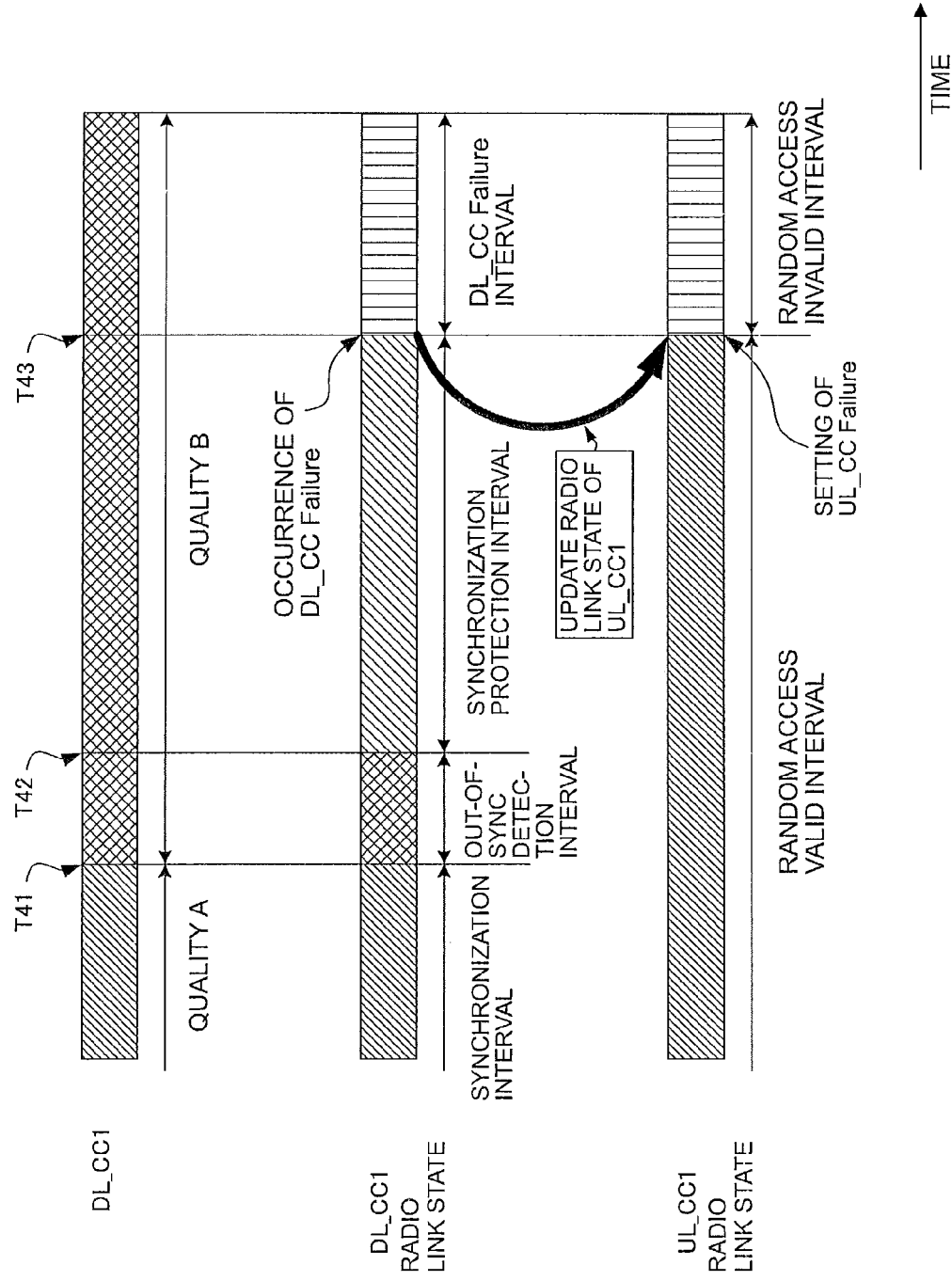
FIG. 4 is a chart illustrating a method of state transition of a radio link state for each component carrier regarding the radio link problem.

In a case exemplified in FIG. 3, the management method for a radio link state of each component carrier, performed by the mobile station apparatus 1 will be further described by using FIG. 4.

FIG. 4 is a chart illustrating a method for state transition with the passage of time of a radio link state for each component carrier managed by the mobile station apparatus 1. A first row of the drawing indicates a reception quality of the DL_CC1, a second row indicates a radio link state of the DL_CC1, and a third row indicates a radio link state of the UL_CC1. The reception quality of the DL_CC1 in an upper row can be separated into a quality A and a quality B. The quality A means a state where a reception quality of a downlink is higher than the threshold value Qout, and downlink out-of-sync is not detected in the physical layer. Meanwhile, the quality B means a state where the reception quality is lower than the threshold value Qout, and the downlink out-of-sync has been detected in the physical layer.

The mobile station apparatus 1 manages the radio link state of the DL_CC1 as a synchronization interval when the reception quality of the DL_CC1 is in a state of the quality A. In addition, the mobile station apparatus 1 manages the radio link state of the UL_CC1 as a random access valid interval. The random access valid interval is the interval where a radio resource (random access information) used for random access transmission is effective, and indicates that the mobile station apparatus 1 is in a state capable of transmitting the random access at an arbitrary timing as necessary. Although a random access valid interval can be further divided by using a timer into an interval where transmission timing adjustment information is effective (transmission timing adjustment state), and an interval where the transmission timing adjustment information is invalid (transmission timing non-adjustment state), the two intervals are omitted in the drawing.

Here, when a reception quality of the DL_CC1 deteriorates at a certain timing T41 and the resultant quality is changed to the quality B, the mobile station apparatus 1 notifies the RRC of downlink out-of-sync from the physical layer, and causes the radio link state of the DL_CC1 to transition to the out-of-sync detection interval. When the mobile station apparatus 1 has continuously received notification of the downlink out-of-sync from the physical layer at a certain number of times, or has continuously received notification of the downlink out-of-sync from the physical layer for a certain time (timing T42), the mobile station apparatus 1 determines that a radio link problem (physical layer problem) has occurred, causes the radio link state of the DL_CC1 to transition to the synchronization protection interval where recovery of the reception quality is waited, and simultaneously starts the synchronization protection timer which clocks the synchronization protection interval.

When the reception quality of the downlink channel is not recovered even if the synchronization protection timer expires (timing T43), the mobile station apparatus 1 determines that the DL_CC1 has reached the DL_CC failure. At this time, the mobile station apparatus 1 causes the radio link state of the DL_CC1 to transition to a DL_CC failure interval. The DL_CC failure interval is the interval in which downlink data received in the component carrier is regarded to be invalid. The mobile station apparatus 1 may stop monitoring of the PDCCH in the DL_CC failure interval. In addition, the mobile station apparatus 1 regards that the UL_CC failure has occurred also in the UL_CC1 cell-specific-linked to the DL_CC1, and performs UL_CC failure setting to the UL_CC1, and also causes the radio link state of the UL_CC1 to transition to a random access invalid interval.

The random access invalid interval is the interval in which the radio resource for random access transmission is regarded to be invalid. The mobile station apparatus 1 cannot transmit the PRACH in the uplink component carrier whose radio link state is in the random access invalid interval. It should be noted that the mobile station apparatus 1 regards that radio resources of all the uplink channels other than the PRACH are invalid in the uplink component carrier whose radio link state is in the random access invalid interval, and that all the transmission is forbidden. The mobile station apparatus 1 may provide notification of release of radio resource setting of the PRACH of the uplink component carrier (UL_CC1), and release of radio resource setting of the other uplink channels, at the same time when updating the radio link state of the UL_CC1. The MAC receives notification of the release of the radio resource setting from the RRC.

Figure 5:
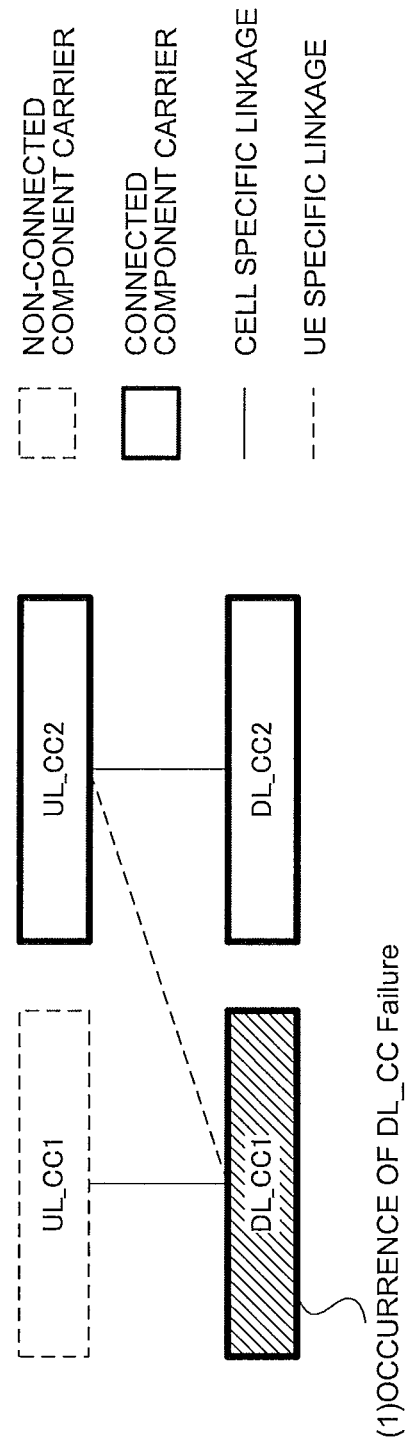
FIG. 5 is another diagram for illustrating the radio link management method when the radio link problem has been detected.

FIG. 5 is another diagram for illustrating the management method of the radio link state of each component carrier in the case where the radio link problem has occurred in the certain downlink component carrier when the plurality of component carriers are configured to the mobile station apparatus 1 by carrier aggregation.

In FIG. 5, the downlink component carrier DL_CC1 and the downlink component carrier DL_CC2, and the uplink component carrier UL_CC1 and the uplink component carrier UL_CC2 are configured to the mobile station apparatus 1 as carrier aggregation by the base station apparatus 2. In addition, the DL_CC1 and the UL_CC2 are UE-specific-linked to each other, and the DL_CC2 and the UL_CC2 are cell-specific-linked to each other.

At this time, when the mobile station apparatus 1 detects occurrence of the DL_CC failure in the DL_CC1, it need not update radio link states of component carriers other than the DL_CC1 since the uplink component carrier cell-specific-linked to the DL_CC1 is not configured to the mobile station apparatus 1. That is, the mobile station apparatus 1 does not update the radio link states of the DL_CC2 and the UL_CC2 which are not cell-specific-linked to the DL_CC1.

Figure 6:
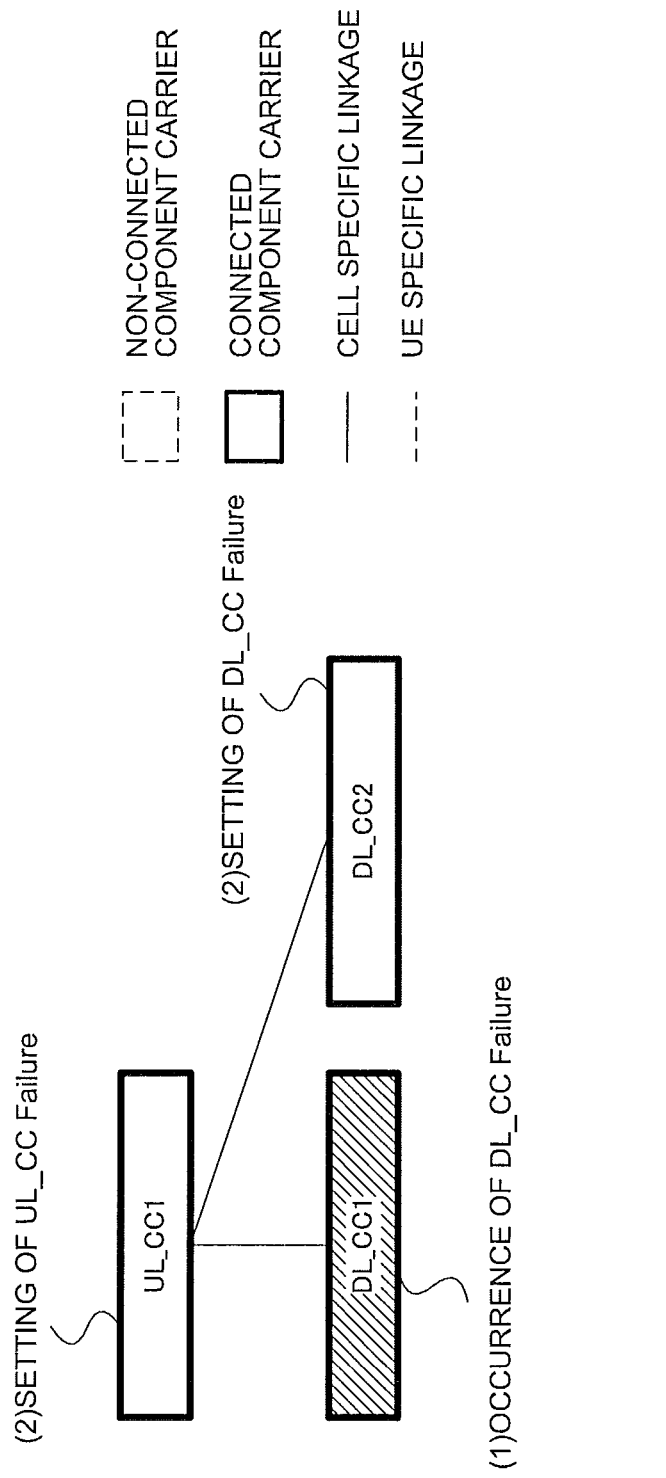
FIG. 6 is a diagram for illustrating a radio link management method when a radio link problem has been detected in a component carrier cell-specific-linked to a component carrier having a plurality of cell-specific linkages.

FIG. 6 is a diagram for illustrating the management method of the radio link state of each component carrier in the case where a radio link problem has occurred in a downlink component carrier cell-specific-linked to a component carrier having a plurality of cell-specific linkages, when the plurality of component carriers are configured to the mobile station apparatus 1 by carrier aggregation.

In FIG. 6, the downlink component carrier DL_CC1 and the downlink component carrier DL_CC2, and the uplink component carrier UL_CC1 are configured to the mobile station apparatus 1 as carrier aggregation by the base station apparatus 2. In addition, the DL_CC1 and the UL_CC1 are cell-specific-linked to each other and furthermore, the DL_CC2 and the UL_CC1 are cell-specific-linked to each other. That is, the UL_CC1 has a plurality of cell-specific linkages.

At this time, when the mobile station apparatus 1 detects occurrence of the DL_CC failure in the DL_CC1, the mobile station apparatus 1 sets the UL_CC failure to the UL_CC1 which is cell-specific-linked to the DL_CC1. In addition, simultaneously, the mobile station apparatus 1 sets the DL_CC failure similarly to the DL_CC2 which is cell-specific-linked to the UL_CC1. That is, the RRC which has detected that the physical layer problem has occurred in the DL_CC1 updates together the radio link state of the UL_CC1 and a radio link state of the DL_CC2 which are corresponding to the DL_CC1.

Figure 7:
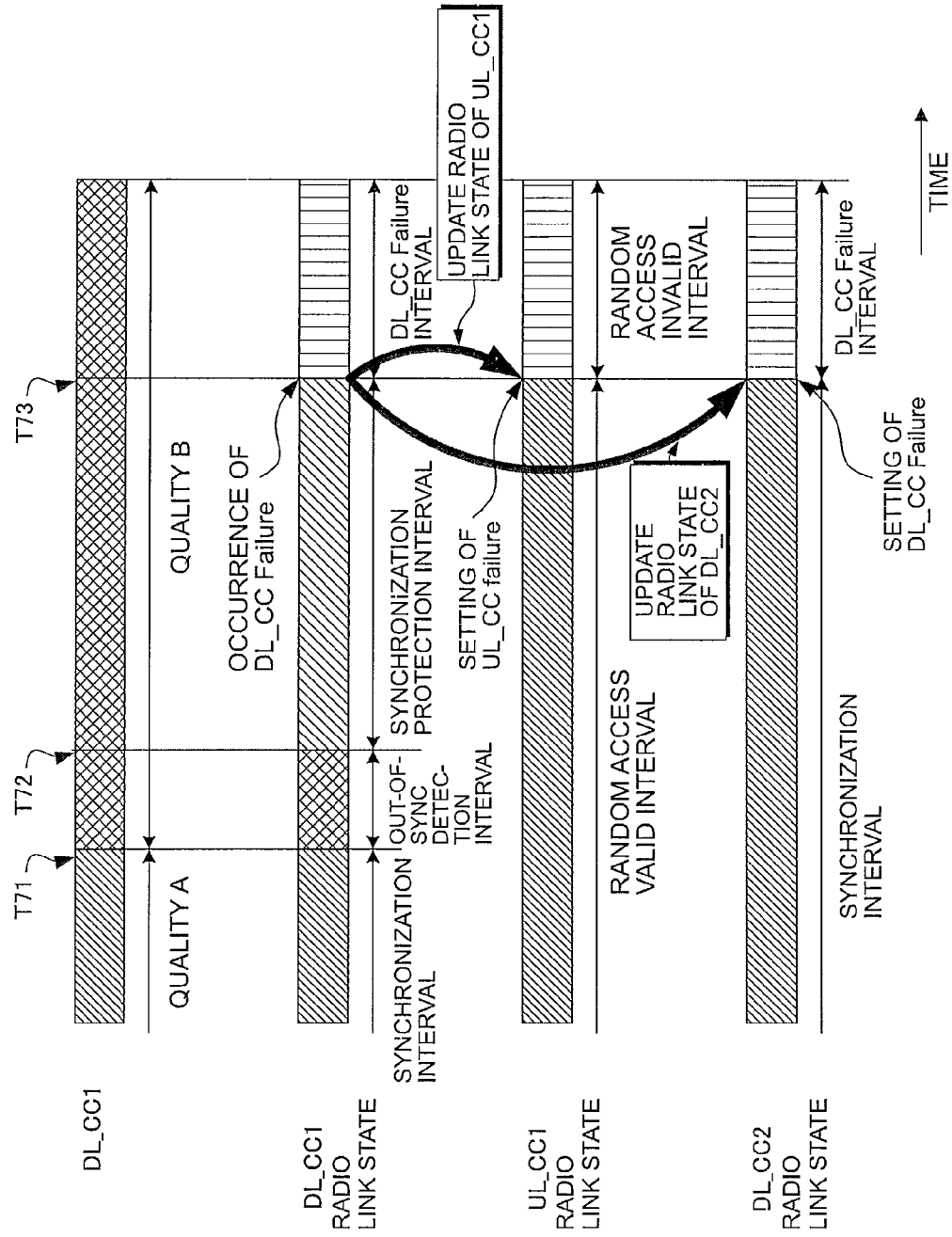
FIG. 7 is another chart illustrating the method for state transition of the radio link state for each component carrier regarding the radio link problem.

In a case exemplified in FIG. 6, the management method for the radio link state of each component carrier performed by the mobile station apparatus 1 will be further described using FIG. 7.

FIG. 7 is a chart illustrating the method for state transition with the passage of time of the radio link state for each component carrier managed by the mobile station apparatus 1. A first row of the drawing indicates a reception quality of the DL_CC1, a second row indicates a radio link state of the DL_CC1, a third row indicates a radio link state of the UL_CC1, and a fourth row indicates a radio link state of the DL_CC2, respectively.

The mobile station apparatus 1 manages the radio link state of the DL_CC1 as the synchronization interval when the reception quality of the DL_CC1 is in a state of the quality A. In addition, the mobile station apparatus 1 manages the radio link state of the UL_CC1 as the random access valid interval. Although the radio link state of the DL_CC2 may be arbitrary, it is defined as the synchronization interval in order to simplify the description.

Here, when a reception quality of the DL_CC1 deteriorates at a certain timing T71 and the resultant quality is changed to the quality B, the mobile station apparatus 1 notifies the RRC of downlink out-of-sync from the physical layer, and causes the radio link state of the DL_CC1 to transition to the out-of-sync detection interval. When the mobile station apparatus 1 has continuously received notification of the downlink out-of-sync from the physical layer at a certain number of times, or has continuously received notification of the downlink out-of-sync from the physical layer for a certain time (timing T72), the mobile station apparatus 1 determines that a radio link problem (physical layer problem) has occurred, causes the radio link state of the DL_CC1 to transition to the synchronization protection interval where recovery of the reception quality is waited, and simultaneously starts the synchronization protection timer which clocks the synchronization protection interval. In the timings T71 and T72, the radio link state of the UL_CC1 or the DL_CC2 is not affected by change of the radio link state of the DL_CC1.

When the reception quality of the downlink channel is not recovered even if the synchronization protection timer expires, the mobile station apparatus 1 determines that the DL_CC1 has reached the DL_CC failure (timing T73). At this time, the mobile station apparatus 1 regards that the UL_CC failure has occurred also in the UL_CC1 cell-specific-linked to the DL_CC1 as well as causing the radio link state of the DL_CC1 to transition to the DL_CC failure interval, performs UL_CC failure setting to the UL_CC1, and causes the radio link state of the UL_CC1 to transition to the random access invalid interval. Moreover, in the same timing T73, the mobile station apparatus 1 regards that the DL_CC failure has occurred also in the DL_CC2 cell-specific-linked to the DL_CC1 via the UL_CC1, performs DL_CC failure setting to the DL_CC2, and causes the radio link state of the DL_CC2 to transition to the DL_CC failure interval.

In this way, while the mobile station apparatus 1 sets as the UL_CC failure the uplink component carrier cell-specific-linked to the downlink component carrier in which the DL_CC failure has occurred, it does not change the radio link state of the uplink component carrier UE-specific-linked. Furthermore, when another downlink component carrier is cell-specific-linked to the uplink component carrier set as the UL_CC failure, the mobile station apparatus 1 sets the downlink component carrier as the DL_CC failure. Consequently, the mobile station apparatus 1 does not perform radio link state management regarding component carriers completely separately for each component carrier, but may just manage the component carriers cell-specific-linked as one group.

Figure 8:
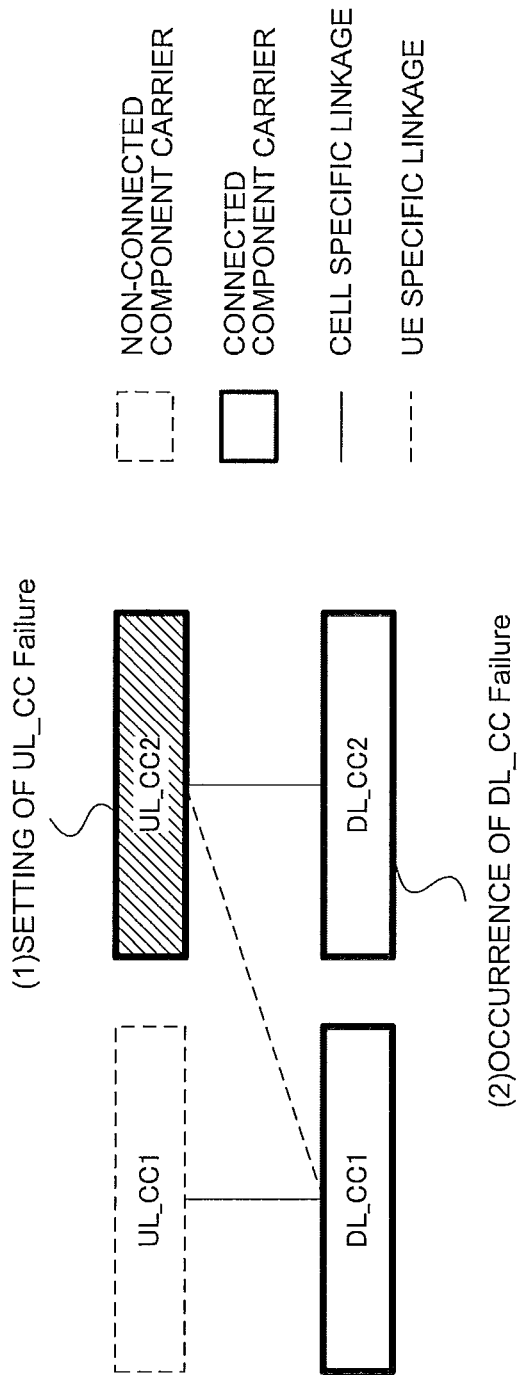
FIG. 8 is another diagram for illustrating the radio link management method when the radio link problem has been detected.

FIG. 8 is another diagram for illustrating the management method for the radio link state of each component carrier in the case where the radio link problem has occurred in the certain uplink component carrier, when the plurality of component carriers is configured to the mobile station apparatus 1 by carrier aggregation. Setting of the component carrier in FIG. 8 is the same as in FIG. 5.

At this time, when the mobile station apparatus 1 detects occurrence of the UL_CC failure in the UL_CC2, a retransmission procedure of transmission data regarding the DL_CC2, etc. are performed by the cooperating UL_CC2, and thus complicated and special control different from a conventional one is required for continuing reception in the DL_CC2 when the UL_CC failure has occurred in the UL_CC2. Consequently, the mobile station apparatus 1 of the embodiment sets the DL_CC failure to the DL_CC2 which is cell-specific-linked to the UL_CC2 in order not to perform the above-described special control. Since the other component carriers are not cell-specific-linked to the UL_CC2, radio link states of the other component carriers are not required to be updated. That is, the RRC which has received notification of the fact that the random access problem has occurred in the UL_CC2, from the MAC updates the radio link state of the DL_CC2 corresponding to the UL_CC2.

Figure 9:
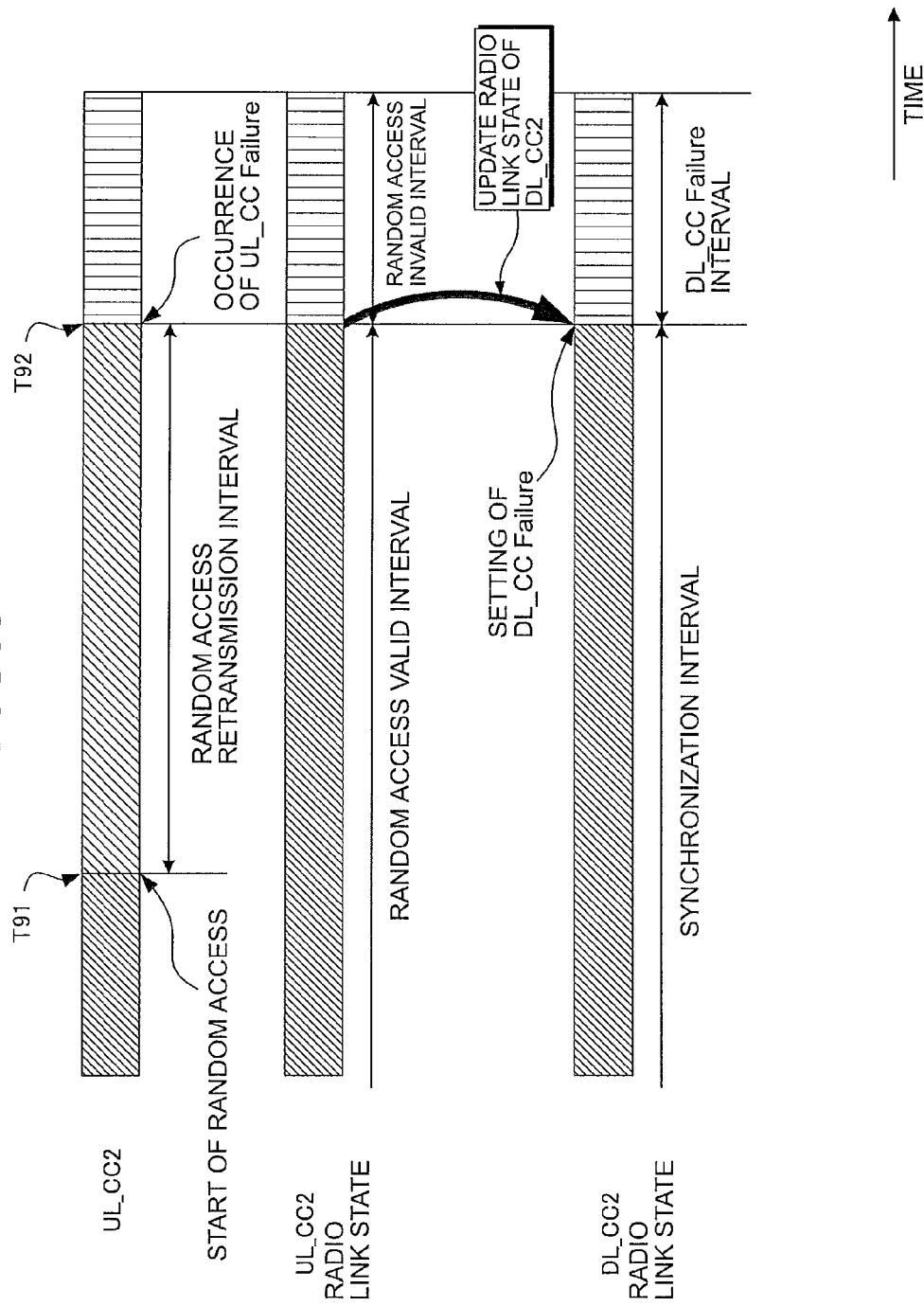
FIG. 9 is another chart illustrating the method for state transition of the radio link state for each component carrier regarding the radio link problem.

In a case exemplified in FIG. 8, the management method for the radio link state of each component carrier performed by the mobile station apparatus 1 will be further described by using FIG. 9.

FIG. 9 is a chart illustrating the method for state transition with the passage of time of the radio link state for each component carrier managed by the mobile station apparatus 1. A first row of the drawing indicates a state of random access of the uplink component carrier UL_CC2, a second row indicates a radio link state of the UL_CC2, and a third row indicates a radio link state of the DL_CC2, respectively.

The mobile station apparatus 1 manages the state of the random access performed in the UL_CC2. The radio link state of the UL_CC2 is defined as the random access invalid interval. In addition, the radio link state of the DL_CC2 is defined as the synchronization interval. Since the radio link state of the DL_CC1 is unrelated to the radio link state of the UL_CC1 or the DL_CC2, a drawing and a description thereof will be omitted.

Here, assume that the mobile station apparatus 1 has started random access at a certain timing T91. The reason for the start of the random access is not questioned. At this time, the mobile station apparatus 1 causes a state of random access of the UL_CC2 to transition to a random access retransmission interval. The random access retransmission interval is a state where random access has been started but is not successful, and the number of trials of random access is counted in the interval. The mobile station apparatus 1 is not required to update the radio link states of the UL_CC2 and the DL_CC2 in the timing T91. In the mobile station apparatus 1, it is regarded that a random access problem has occurred in the UL_CC2 when the number of trials of random access reaches a predetermined number of times, and the MAC notifies the RRC of the random access problem. The mobile station apparatus 1 which has received notification of the random access problem from the MAC sets the UL_CC failure to the UL_CC2 (timing T92).

The mobile station apparatus 1 causes the radio link state of the UL_CC2 to transition to the random access invalid interval at the same timing T92. In addition, the mobile station apparatus 1 regards that the DL_CC failure has occurred in the DL_CC2 cell-specific-linked to the UL_CC2 at the timing T92, performs DL_CC failure setting to the DL_CC2, and causes the radio link state of the DL_CC2 to transition to the DL_CC failure interval.

Figure 10:
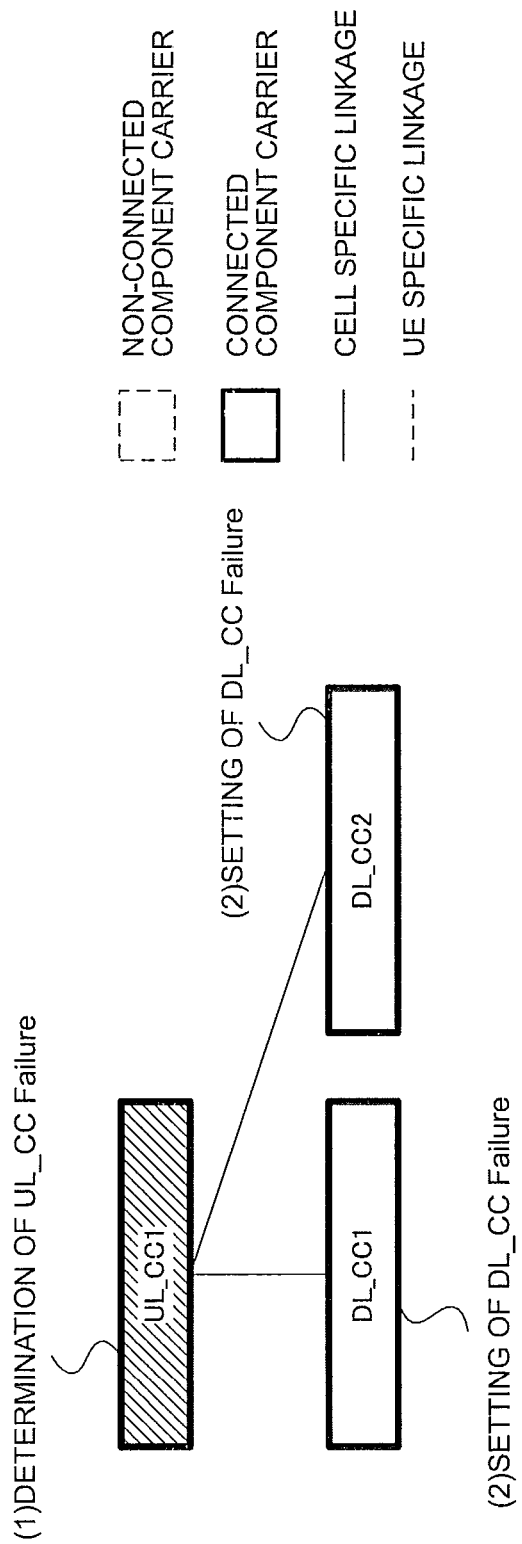
FIG. 10 is a diagram for illustrating a radio link management method when a radio link problem has occurred in the component carrier having the plurality of cell-specific linkages.

FIG. 10 is a diagram for illustrating the management method for the radio link state of each component carrier in a case where a radio link problem occurs in an uplink component carrier having a plurality of cell-specific linkages, when the plurality of component carriers is configured to the mobile station apparatus 1 by carrier aggregation. Setting of the component carrier in FIG. 10 is the same as in FIG. 6.

At this time, when the mobile station apparatus 1 detects occurrence of the UL_CC failure in the UL_CC1, the mobile station apparatus 1 sets the DL_CC failure to the DL_CC1 which is cell-specific-linked to the UL_CC1. In addition, simultaneously, the mobile station apparatus 1 sets the DL_CC failure similarly to the DL_CC2 which is cell-specific-linked to the UL_CC1. That is, the RRC which has received notification of the occurrence of the random access problem from the MAC in the UL_CC1 updates both of the radio link state of the DL_CC1 corresponding to the UL_CC1, and the radio link state of the DL_CC2.

Figure 11:
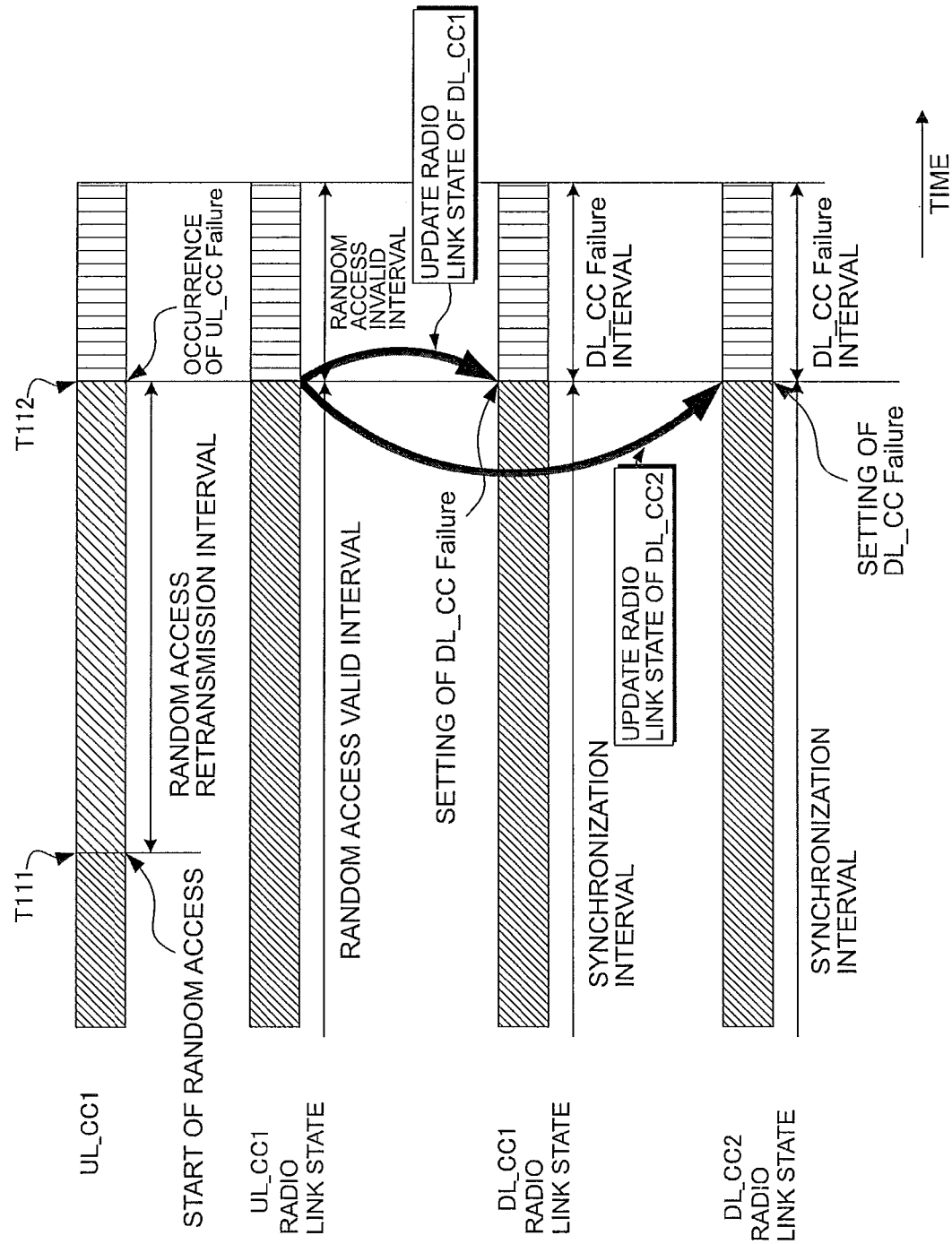
FIG. 11 is another chart illustrating the method for state transition of the radio link state for each component carrier regarding the radio link problem.

In a case exemplified in FIG. 10, the management method for the radio link state of each component carrier, performed by the mobile station apparatus 1 will be further described using FIG. 11.

FIG. 11 is a chart illustrating the method for state transition with the passage of time of the radio link state for each component carrier, managed by the mobile station apparatus 1. A first row of the drawing indicates a state of random access of the uplink component carrier UL_CC1, a second row indicates a radio link state of the UL_CC1, a third row indicates a radio link state of the DL_CC1, and a fourth row indicates a radio link state of the DL_CC2, respectively.

The mobile station apparatus 1 manages the state of the random access performed in the UL_CC1. The radio link state of the UL_CC1 is defined as the random access invalid interval. In addition, the radio link states of the DL_CC1 and the DL_CC2 are defined as the synchronization interval.

Here, assume that the mobile station apparatus 1 has started random access in a certain timing T111. The reason for the start of the random access is not questioned. At this time, the mobile station apparatus 1 causes a state of random access of the UL_CC1 to transition to the random access retransmission interval. The mobile station apparatus 1 is not required to update the radio link states of the UL_CC1, the DL_CC1, and the DL_CC2 in the timing T111. In the mobile station apparatus 1, it is regarded that a random access problem has occurred in the UL_CC1 when the number of trials of random access reaches a predetermined number of times, and the MAC notifies the RRC of the random access problem. The mobile station apparatus 1 which has received notification of the random access problem from the MAC sets the UL_CC failure to the UL_CC1 (timing T112).

The mobile station apparatus 1 causes the radio link state of the UL_CC1 to transition to the random access invalid interval at the same timing T112. In addition, the mobile station apparatus 1 regards that the DL_CC failure has occurred in the DL_CC1 and the DL_CC2 cell-specific-linked to the UL_CC1 at the timing T112, performs DL_CC failure setting to both the DL_CC1 and the DL_CC2, and causes the radio link states of the DL_CC1 and the DL_CC2 to transition to the DL_CC failure interval.

Figure 12:
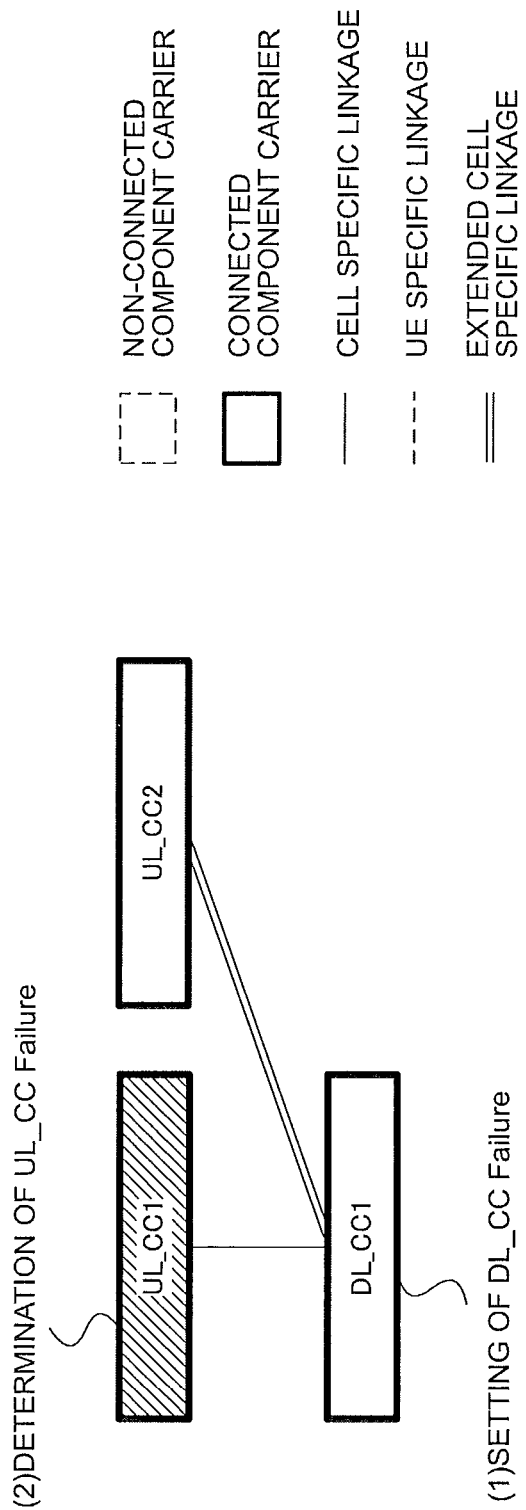
FIG. 12 is a diagram for illustrating a radio link management method when a radio link problem has occurred in a component carrier having an extended cell-specific linkage.

FIG. 12 is a diagram for illustrating the management method of the radio link state of each component carrier in a case where a radio link problem has occurred in a certain downlink component carrier when the downlink component carrier has an extended cell-specific linkage effective only for a specific mobile station apparatus 1, when the plurality of component carriers is configured to the mobile station apparatus 1 by carrier aggregation.

In FIG. 12, the downlink component carrier DL_CC1 and the uplink component carrier UL_CC1, and the uplink component carrier UL_CC2 are configured to the mobile station apparatus 1 as carrier aggregation by the base station apparatus 2. In addition, the DL_CC1 and the UL_CC1 are cell-specific-linked to each other and furthermore, the DL_CC1 and the UL_CC2 are extended-cell-specific-linked to each other. Extended cell-specific linkage is the cell-specific linkage effective only for, for example, the specific mobile station apparatus 1 (a mobile station apparatus 1 or the like having an extended function, which will be released in the future), and is notified by new broadcast information which can be received only by the specific mobile station apparatus 1, or information of a predefined frequency difference between the uplink and the downlink effective only for the specific mobile station apparatus 1. That is, although a usual mobile station apparatus 1 which has accessed the DL_CC1 recognizes that only the DL_CC1 and the UL_CC1 are cell-specific-linked, the specific mobile station apparatus 1 recognizes that the DL_CC1 and the UL_CC2 are extended-cell-specific-linked. The specific mobile station apparatus 1 may just have the same configuration as the usual mobile station apparatus 1 except for receiving the new broadcast information effective only for the specific mobile station apparatus 1, or except for holding the information of the predefined frequency difference between the uplink and the downlink.

At this time, a radio link state management method when the usual mobile station apparatus 1 has detected occurrence of the DL_CC failure in the DL_CC1 may be the same as in FIG. 6 or 8, and thus a detailed description of the method will be omitted.

Meanwhile, when the specific mobile station apparatus 1 which can recognize an extended cell-specific linkage between component carriers detects occurrence of the DL_CC failure in the DL_CC1, the specific mobile station apparatus 1 is not required to update the radio link state of the UL_CC2 which is extended-cell-specific-linked to the DL_CC1. That is, the specific mobile station apparatus 1 does not update the radio link state of the UL_CC2 which is extended-cell-specific-linked to the DL_CC1.

In this way, while the mobile station apparatus 1 sets as the DL_CC failure the downlink component carrier cell-specific-linked to the uplink component carrier in which the UL_CC failure has occurred, it does not change the radio link state of the downlink component carrier UE-specific-linked. Furthermore, when another downlink component carrier other than the downlink component carrier set as the DL_CC failure is cell-specific-linked, the mobile station apparatus 1 sets the downlink component carrier as the DL_CC failure. Consequently, the mobile station apparatus 1 does not perform radio link state management regarding component carriers completely separately for each component carrier, but may just manage the component carriers cell-specific-linked as one group.

As a result of updating the radio link states of the downlink component carrier and/or the uplink component carrier which are/is cell-specific-linked to the downlink component carrier in which the DLCC failure has been detected, or to the uplink component carrier in which the UL_CC failure has been detected, when all the downlink component carriers whose radio link states are managed by the mobile station apparatus 1 are set as the DL_CC failure, or when all the uplink component carriers whose radio link states are managed by the mobile station apparatus 1 are set as the UL_CC failure, the mobile station apparatus 1 determines that a radio link failure has occurred, and starts a radio resource reestablishment procedure.

That is, when the RRC (radio link state management unit) of the mobile station apparatus 1 sets the radio link states of all the downlink component carriers as the DL_CC failure, or when the RRC sets the radio link states of all the uplink component carriers as the UL_CC failure, it starts the radio resource reestablishment procedure.

In this way, in the first embodiment, the mobile station apparatus 1 performs determination and detection of a physical layer problem for each downlink component carrier. In addition, the mobile station apparatus 1 performs determination and detection of a random access problem for each uplink component carrier in which a PRACH has been configured. Subsequently, when the mobile station apparatus 1 detects a radio link problem (a physical layer problem or the random access problem) as a method for managing a radio link state, it updates radio link states of all the component carriers cell-specific-linked, with the component carrier in which the radio link problem has occurred being as a starting point. It is suitable that update of the radio link state of the downlink component carrier or the uplink component carrier is performed by the RRC (radio link state management unit) of the mobile station apparatus 1.

As described above, since the mobile station apparatus 1 may just determine which radio link state of the component carrier may just be updated in accordance with whether or not there is any cell-specific linkage between the component carriers along with the occurrence of the radio link problem, even in a case where it is necessary to manage the radio link states of the plurality of component carriers by carrier aggregation, management of the radio link state is simplified. In addition, since it becomes possible to manage the radio link problem for each component carrier cell-specific-linked instead of managing the radio link problem independently for each component carrier, the management method becomes efficient. In addition, since transmission is no longer performed in the corresponding uplink when the physical layer problem has occurred, it becomes unnecessary for the mobile station apparatus 1 to perform complicated and special control for the random access procedure and transmit power adjustment in the corresponding uplink even if the physical layer problem has occurred. In addition, since reception is no longer performed in the corresponding downlink when the random access problem has occurred, it becomes unnecessary for the mobile station apparatus 1 to perform complicated and special control for a retransmission procedure of data received in the corresponding downlink, etc. even if the random access problem has occurred.

Second Embodiment

A second embodiment of the present invention will be described hereinafter. The embodiment relates to a management method for a radio link state of a component carrier by the mobile station apparatus 1 during carrier aggregation when a special component carrier is set to a downlink component carrier or an uplink component carrier, and a radio link problem has occurred in the component carrier.

Since configurations of the mobile station apparatus 1 and the base station apparatus 2 which are used for the embodiment may just be the same configurations as in, respectively, FIGS. 1 and 2, descriptions thereof will be omitted.

The mobile station apparatus 1 configures one of the downlink component carriers configured by the base station apparatus 2 as a special downlink component carrier. Here, the downlink component carrier is referred to as a downlink anchor carrier. The downlink anchor carrier may be individually configured to the mobile station apparatus 1 by the base station apparatus 2, or may be configured as a downlink component carrier which provides information used for security information etc. among the downlink component carriers configured to the mobile station apparatus 1.

In addition, the mobile station apparatus 1 configures one of the uplink component carriers configured by the base station apparatus 2 as a special uplink component carrier. Here, the uplink component carrier is referred to as an uplink anchor carrier. The uplink anchor carrier may be individually configured to the mobile station apparatus 1 by the base station apparatus 2, or may be configured as an uplink component carrier to which the PUCCH for transmitting reception confirmation information (ACK/NACK) etc. has been configured among the uplink component carriers configured to the mobile station apparatus 1.

As a result of updating a radio link state of a component carrier cell-specific-linked in accordance with the first embodiment after the occurrence of the radio link problem in a case where both the downlink anchor carrier and the uplink anchor carrier, or one of them are/is configured to the mobile station apparatus 1, when the downlink anchor carrier has become the DL_CC failure and the uplink anchor carrier has become the UL_CC failure, the mobile station apparatus 1 updates the radio link states of all the component carriers to the DL_CC failure or the UL_CC failure regardless of radio link states of the other component carriers to thereby determine that a radio link failure has occurred, and starts the radio resource reestablishment procedure.

Alternatively, when a physical layer problem has occurred in the downlink anchor carrier, or when a random access problem has occurred in the uplink anchor carrier in a case where both the downlink anchor carrier and the uplink anchor carrier, or one of them are/is configured to the mobile station apparatus 1, the mobile station apparatus 1 updates the radio link states of all the component carriers to the DL_CC failure or the UL_CC failure regardless of radio link states of the other component carriers to thereby determine that the radio link failure has occurred, and starts the radio resource reestablishment procedure.

In this way, in the second embodiment, the mobile station apparatus 1 performs determination and detection of the physical layer problem of the downlink anchor carrier, or the random access problem of the uplink anchor carrier separately from the other component carriers. Additionally, when the mobile station apparatus 1 has detected the radio link problem (the physical layer problem or the random access problem) in the downlink anchor carrier or the uplink anchor carrier, it updates the radio link states of all the other component carriers. It is suitable that update of the radio link state of the downlink component carrier or the uplink component carrier is performed by the RRC of the mobile station apparatus 1.

As described above, when the downlink anchor carrier has become the DL_CC failure and the uplink anchor carrier has become the UL_CC failure by setting the downlink anchor carrier or the uplink anchor carrier, the mobile station apparatus 1 may just start the radio resource reestablishment procedure regardless of the radio link states of the other component carriers, and thus management of the radio link state is further simplified.

It should be noted that the embodiments described above are only mere exemplification, and the present invention can be achieved by using various modified examples and substitution examples.

For example, the DL_CC failure and the UL_CC failure in the embodiments described above may be managed in relation to DL_CC Deactivation and UL_CC Deactivation, respectively. The DL_CC Deactivation is a state where at least reception processing of the PDSCH is not performed in the mobile station apparatus 1 although information required to perform the reception processing in the downlink component carrier has been configured by the base station apparatus 2. The UL_CC Deactivation is a state where at least transmission processing of the PUSCH is not performed in the mobile station apparatus 1 although information required to perform the transmission processing in the uplink component carrier has been configured by the base station apparatus 2.

That is, each component carrier has deactivation (the DL_CC Deactivation and the UL_CC Deactivation) intervals as radio link state instead of the DL_CC failure and the UL_CC failure. The mobile station apparatus 1 changes the radio link state into deactivation when not using the component carrier configured by the base station apparatus 2. Conditions for the mobile station apparatus 1 changing the radio link state of the component carrier to deactivation may be the same as conditions for the mobile station apparatus 1 determining the radio link state of the component carrier to be the DL_CC failure or the UL_CC failure in the above-described embodiment. The mobile station apparatus 1 may explicitly receive notification of transition to the deactivation and return from the deactivation, from the base station apparatus 2. It is possible for the base station apparatus 2 to use the PDCCH, an MAC message (MAC control element), and an RRC message as a method for notifying the mobile station apparatus 1. When the mobile station apparatus 1 sets the radio link state of the component carrier to be deactivation (the DL_CC Deactivation or the UL_CC Deactivation) based on detection of the radio link problem, or notification from the base station apparatus 2, it may simultaneously cause a radio link state of another component carrier having a cooperation relation with the component carrier set as the deactivation as in the above-described embodiments, to transition to deactivation.

In addition, although the mobile station apparatus 1 and the base station apparatus 2 of the embodiments have been described by using functional block diagrams for convenience of description, control of the mobile station apparatus or the base station apparatus may be performed by recording a program for achieving functions of respective units of the mobile station apparatus 1 and the base station apparatus 2 or a part of the functions, on a computer-readable recording medium, causing the program recorded in this recording medium to be read by a computer system, and executing the program. It should be noted that the "computer system" herein is supposed to include an OS and hardwares such as a peripheral device.

In addition, the "computer-readable recording medium" means a storage device, such as: a portable medium including a semiconductor medium (for example, a RAM, a nonvolatile memory card, etc.), an optical recording medium (for example, a DVD, an MO, an MD, a CD, a BD, etc.), and a magnetic recording medium (for example, a magnetic tape, a flexible disk, etc.); and a disk unit incorporated in the computer system. Furthermore, the "computer-readable recording medium" may also include a medium that dynamically holds a program for a short time and a medium that holds the program for a certain time just like a volatile memory inside the computer system serving as a server or a client in that case, like a communication wire used when the program is transmitted via the communication line such as the network like the Internet, and the telephone line. In addition, the above-described program may be the program for achieving a part of the above-mentioned function and further, it may be the program in which the above-mentioned function can be achieved in combination with the program having been already recorded in the computer system.

Moreover, each functional block of the mobile station apparatus 1 and the base station apparatus 2 used as the above-described each embodiment may be typically realized as an LSI which is an integrated circuit. Each functional block may be chipped individually, or a part or all of them may be integrated and chipped. In addition, a technique for making the functional blocks into the integrated circuit may be realized not only as the LSI but as a dedicated circuit or a general-purpose processor. Moreover, when a technology for making the functional blocks into the integrated circuit as an alternative to the LSI appears due to progress of a semiconductor technology, it is also possible to use an integrated circuit made by the technology.

As described above, although the embodiments of the present invention have been mentioned in detail with reference to the drawings, a specific configuration is not limited to the embodiments, and a design and the like within the scope not departing from the main purpose of the present invention are included in the claims.

DESCRIPTION OF SYMBOLS

1 . . . MOBILE STATION APPARATUS
2 . . . BASE STATION APPARATUS
11 to 13 . . . TRANSMISSION APPARATUS
21 to 23 . . . RECEPTION APPARATUS
101 and 201 . . . RECEPTION UNIT
102 and 202 . . . DEMODULATION UNIT
103 and 203 . . . DECODING UNIT
104 . . . MEASUREMENT PROCESSING UNIT
105 and 204 . . . CONTROL UNIT
106 . . . RANDOM ACCESS PROCESSING UNIT
107 and 205 . . . ENCODING UNIT
108 and 206 . . . MODULATION UNIT
109 and 207 . . . TRANSMISSION UNIT
110 and 210 . . . HIGHER LAYER
208 . . . NETWORK SIGNAL TRANSMISSION AND RECEPTION UNIT
209 . . . NEIGHBORING INFORMATION MANAGEMENT UNIT

The invention claimed is:

1. A communication system comprising a base station apparatus and a mobile station apparatus which communicate with each other by aggregating a plurality of cells of different frequencies, wherein
   the base station apparatus, in a case of configuring a plurality of cells of different frequencies to the mobile station apparatus, notifies the mobile station apparatus of and configures linkage information indicating a cooperation relation between an uplink and a downlink for the cell and a timer for managing a state of the cell, and
   the mobile station apparatus simultaneously changes states of the uplink and the downlink of the cell, the timer for which has expired, based on the linkage information configured by the base station apparatus.

2. The communication system according to claim 1, wherein
   the mobile station apparatus, with respect to the cell, the timer for which has expired, stops transmission of uplink data as transmission processing of an uplink related to the cell and stops monitoring of a physical downlink control channel as reception processing of a downlink related to the cell.

3. The communication system according to claim 1, wherein
   the mobile station apparatus adapts the cell, the timer for which has expired, to a deactivation state.

4. A mobile station apparatus in a communication system comprising a base station apparatus and a mobile station apparatus which communicate with each other by aggregating a plurality of cells of different frequencies, wherein
the mobile station apparatus
configures linkage information indicating a cooperation relation between an uplink and a downlink for the cell and a timer for managing a state of the cell which have been notified from the base station apparatus, and
simultaneously changes states of the uplink and the downlink of the cell, the timer for which has expired, based on the linkage information configured by the base station apparatus.

5. The mobile station apparatus according to claim 4, wherein the mobile station apparatus,
with respect to the cell, the timer for which has expired,
stops transmission of uplink data as transmission processing of an uplink related to the cell, and
stops monitoring of a physical downlink control channel as reception processing of a downlink related to the cell.

6. The mobile station apparatus according to claim 4, wherein
the mobile station apparatus adapts the cell, the timer for which has expired, to a deactivation state.

7. A radio link state management method of a mobile station apparatus in a communication system comprising a base station apparatus and a mobile station apparatus which communicate with each other by aggregating a plurality of cells of different frequencies, the radio link state management method comprising the steps of:
configuring linkage information indicating a cooperation relation between an uplink and a downlink for the cell and a timer for managing a state of the cell which have been notified from the base station apparatus; and
simultaneously changing states of the uplink and the downlink of the cell, the timer for which has expired, based on the linkage information configured by the base station apparatus.

8. The radio link state management method according to claim 7, comprising the steps of:
with respect to the cell, the timer for which has expired,
stopping transmission of uplink data as transmission processing of an uplink related to the cell; and
stopping monitoring of a physical downlink control channel as reception processing of a downlink related to the cell.

9. The radio link state management method according to claim 7, comprising a step of adapting the cell, the timer for which has expired, to a deactivation state.

10. An integrated circuit mounted in a mobile station apparatus in a communication system comprising a base station apparatus and a mobile station apparatus which communicate with each other by aggregating a plurality of cells of different frequencies and causing the mobile station apparatus to exert a plurality of functions, the integrated circuit causing the mobile station apparatus to exert a series of functions of:
configuring linkage information indicating a cooperation relation between an uplink and a downlink of the cell and a timer for managing a state of the cell which have been notified from the base station apparatus, and
simultaneously changing states of an uplink and a downlink of the cell, the timer for which has expired, based on the linkage information configured by the base station apparatus.

* * * * *